United States Patent
Ishihara

(10) Patent No.: US 12,135,875 B2
(45) Date of Patent: Nov. 5, 2024

(54) I/O COMMAND CONTROL DEVICE AND INFORMATION STORAGE DEVICE

(71) Applicant: Kioxa Corporation, Tokyo (JP)

(72) Inventor: Takeshi Ishihara, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 49 days.

(21) Appl. No.: 17/548,104

(22) Filed: Dec. 10, 2021

(65) Prior Publication Data
US 2023/0072572 A1    Mar. 9, 2023

(30) Foreign Application Priority Data

Sep. 8, 2021   (JP) .................. 2021-146264

(51) Int. Cl.
*G06F 3/06*    (2006.01)
*G06F 12/14*   (2006.01)

(52) U.S. Cl.
CPC ............ *G06F 3/061* (2013.01); *G06F 3/0659* (2013.01); *G06F 3/0679* (2013.01); *G06F 12/1408* (2013.01)

(58) Field of Classification Search
CPC ...... G06F 3/061; G06F 3/0659; G06F 3/0679; G06F 12/1408
See application file for complete search history.

(56) References Cited

U.S. PATENT DOCUMENTS 9,225,696 B2   12/2015   Pascariello et al.
9,678,962 B2   6/2017    Pinkney et al.
2007/0180210 A1*   8/2007   Thibadeau ............... G06F 21/32
                                                            711/163
2008/0148051 A1*   6/2008   Ozaki ................... H04L 9/3263
                                                            713/168
2012/0017271 A1    1/2012   Smith et al.
2018/0322069 A1*   11/2018  Heinrich ................. G06F 21/85
(Continued)

FOREIGN PATENT DOCUMENTS

JP   2008-112343 A   5/2005
JP   5760592 B2      8/2015
JP   2022-135641 A   9/2022

OTHER PUBLICATIONS

Frederick Knight et al., "TCG SSC: Key Per IO", USENIX Vault '20, Feb. 2020, pp. 1-24.
(Continued)

*Primary Examiner* — Kalpit Parikh
(74) *Attorney, Agent, or Firm* — Maier & Maier, PLLC

(57) ABSTRACT

According to one embodiment, an I/O command control device receives authorization information indicating whether execution of an I/O command is permitted. When the received authorization information is not modified and is issued from a known authorization server, the I/O command control device verifies whether the received authorization information permits execution of the I/O command. The I/O command control device permits or inhibits execution of the I/O command or a control command generated from the I/O command with respect to a logical area that is an execution target of the I/O command, in accordance with an authorization result indicating whether the received authorization information permits execution of the I/O command.

15 Claims, 17 Drawing Sheets

(56) References Cited

U.S. PATENT DOCUMENTS

2019/0236031 A1\* 8/2019 Kim .................. G06F 21/78
2022/0283742 A1 9/2022 Ishihara et al.

OTHER PUBLICATIONS

Jinwoo Ahn et al., "Key-SSD: Access-Control Drive to Protect Files from Ransomware Attacks", arXiv:1904.05012v1 [cs.CR], 2019; 14 pages.

\* cited by examiner

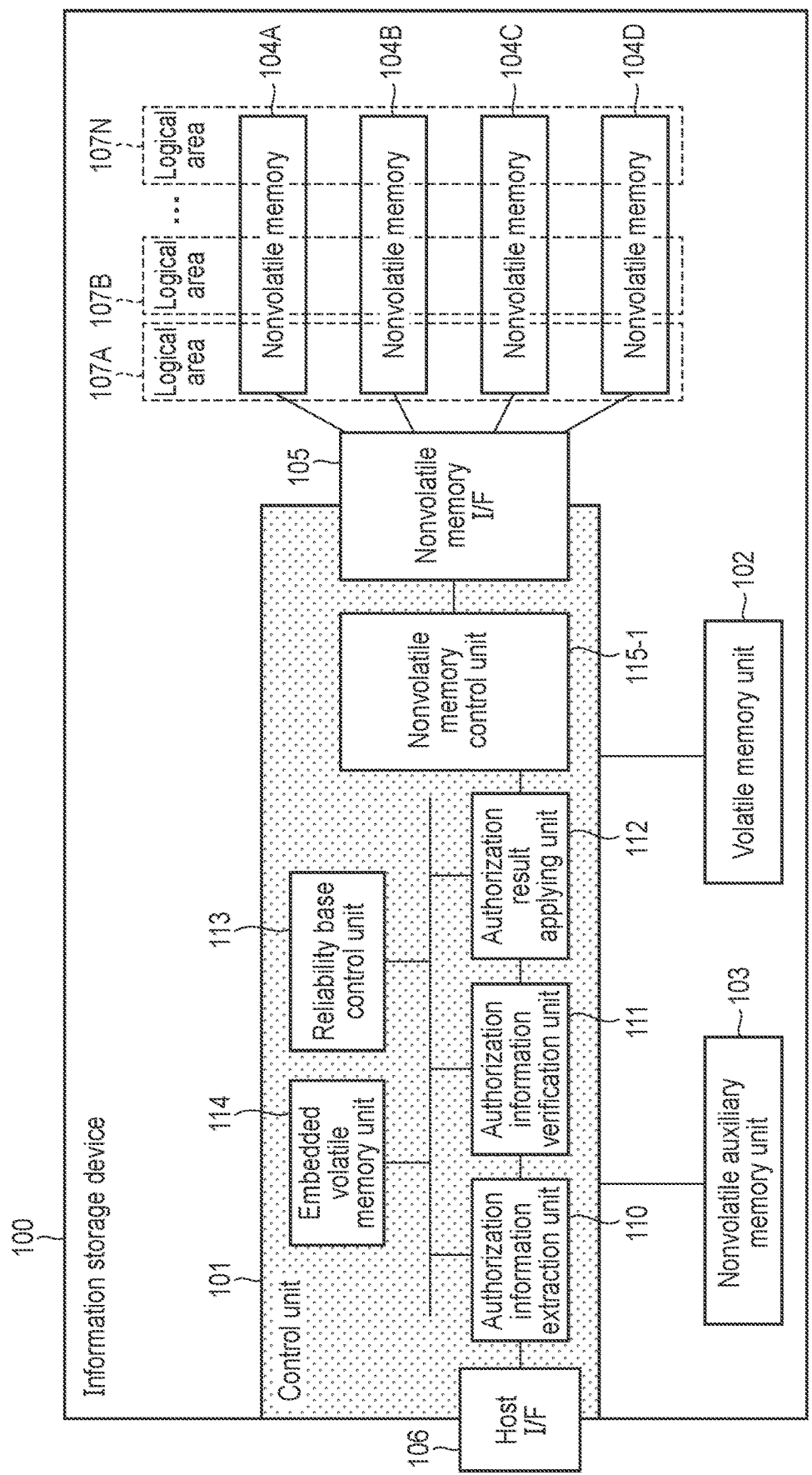
F I G. 1

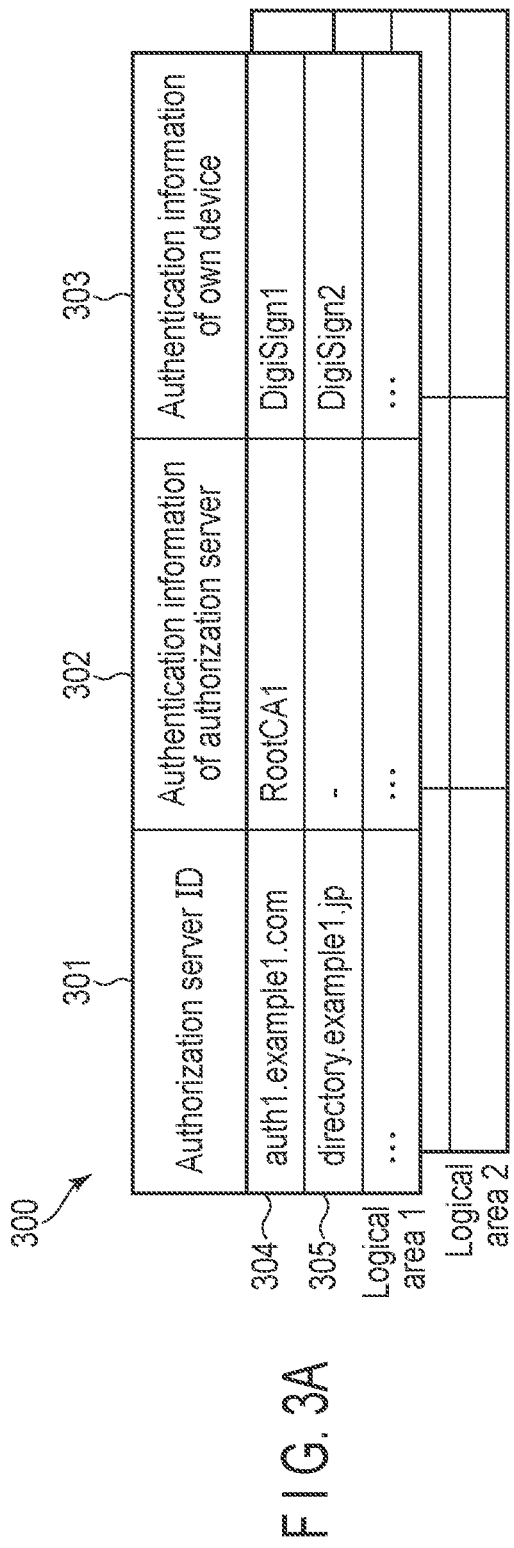
F I G. 3A
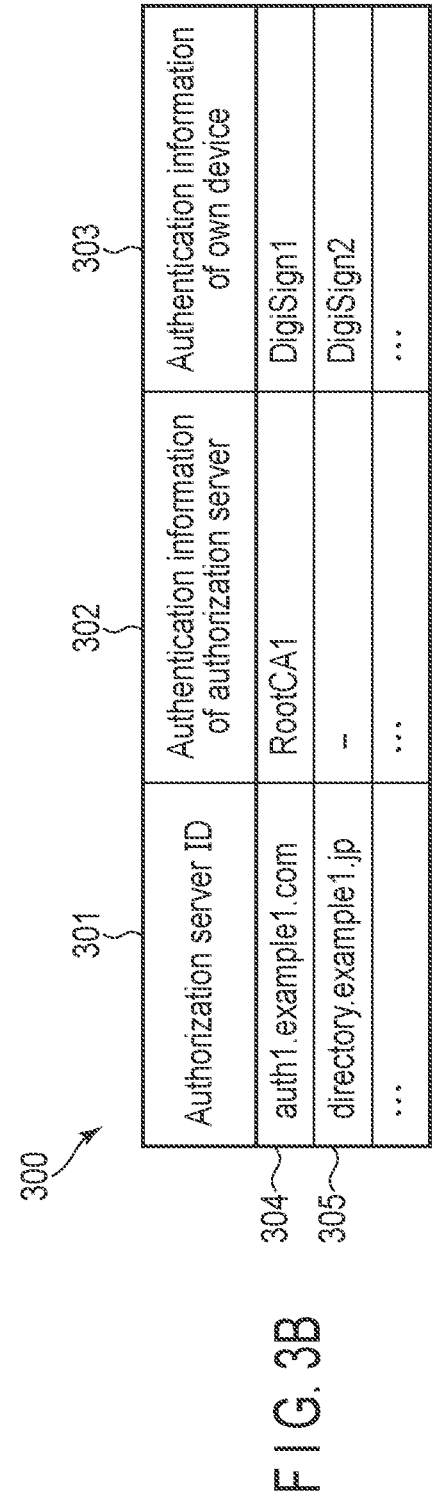
F I G. 3B

| Expiration date (400) | Target logical area (401) | Target I/O command (402) | Authorization target object (403) | Authorization time (404) | Referable period/ storage period (405) |
|---|---|---|---|---|---|
| T11 (410) | LS1 | READ | OBJ1 | T12 | T13 |
| T21 (411) | LS2 | WRITE | OBJ2 | T22 | T23 |
| ⋮ | ⋮ | ⋮ | ⋮ | ⋮ | ⋮ |

FIG. 4

| Expiration date (400) | Target logical area (401) | Target I/O command (402) | Authorization target object (403) |
|---|---|---|---|
| T11 (410) | LS1 | READ | OBJ1 |
| T21 (411) | LS2 | WRITE | OBJ2 |
| ⋮ | ⋮ | ⋮ | ⋮ |

(A)

| Expiration date (400) | Target logical area (401) | Target I/O command (402) | Authorization target object (403) | Authorization time (404) | Referable period/ storage period (405) |
|---|---|---|---|---|---|
| T11 (410) | LS1 | READ | OBJ1 | T12 | T13 |
| T21 (411) | LS2 | WRITE | OBJ2 | T22 | T23 |
| ⋮ | ⋮ | ⋮ | ⋮ | ⋮ | ⋮ |

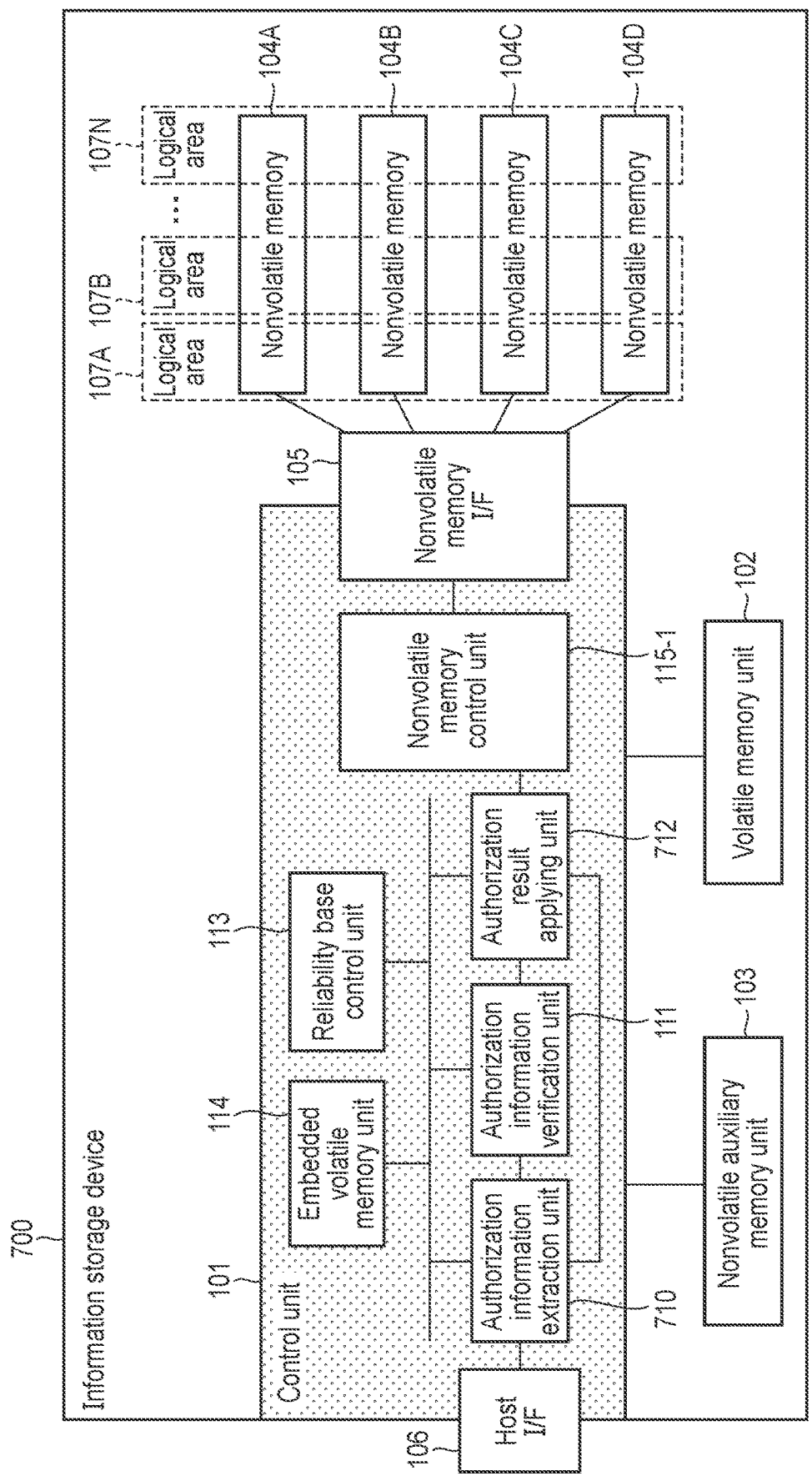
F I G. 7

| ID | Target I/O command etc. |
|---|---|
| ID1 | READ/LS1,OBJ1 |
| ID2 | WRITE/LS2,OBJ2 |
| ⋮ | ⋮ |

FIG. 8

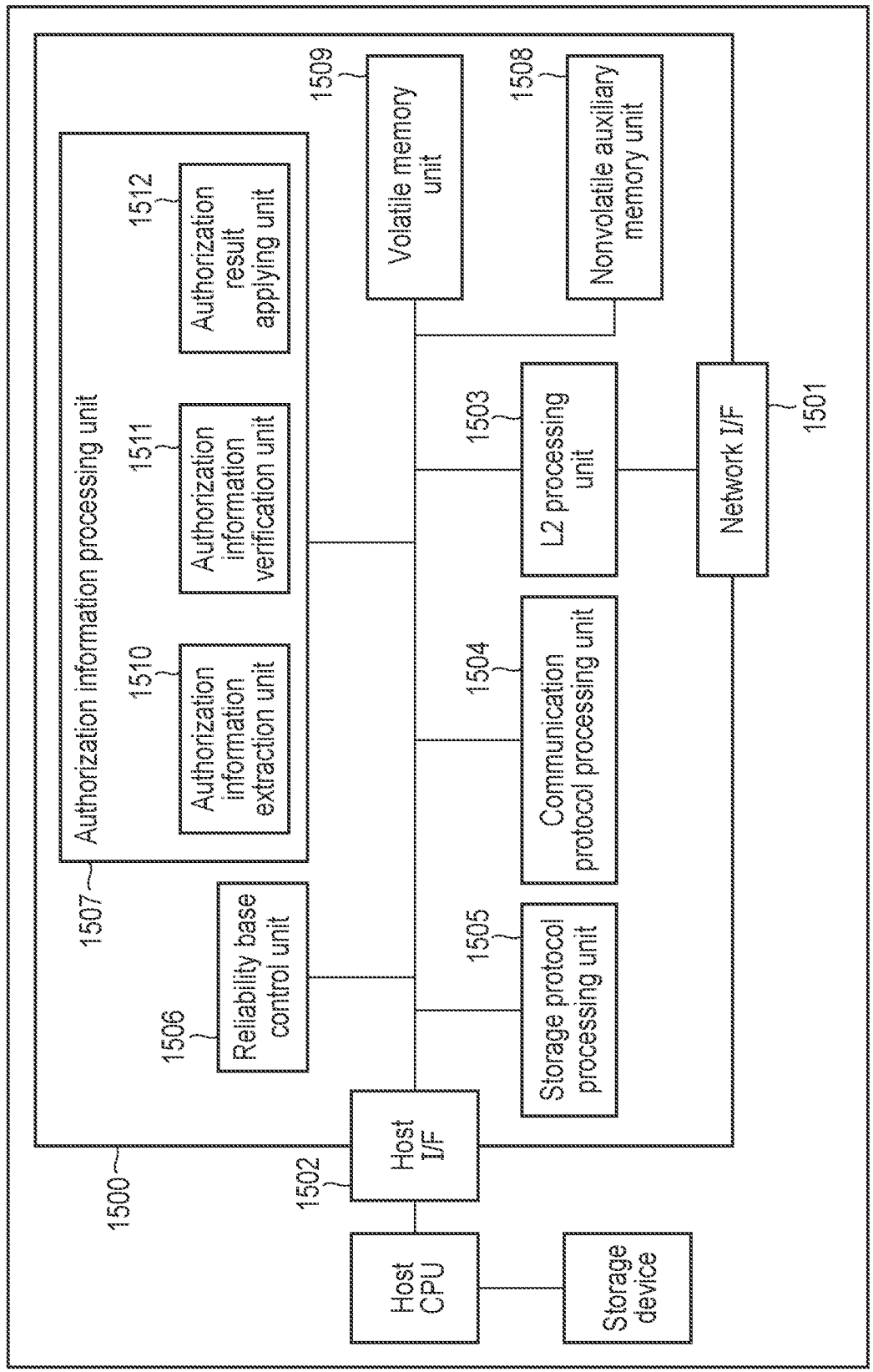
F I G. 15

I/O COMMAND CONTROL DEVICE AND INFORMATION STORAGE DEVICE

CROSS-REFERENCE TO RELATED APPLICATIONS

This application is based upon and claims the benefit of priority from Japanese Patent Application No. 2021-146264, filed Sep. 8, 2021, the entire contents of which are incorporated herein by reference.

FIELD

Embodiments described herein relate generally to an I/O command control device connectable to an information storage device such as a hard disk drive (HDD) or a solid state drive (SSD), and an information storage device.

BACKGROUND

Information storage devices such as a hard disk drive (HDD) and a solid state drive (SSD) are configured to read and write information based on an I/O command from a host device.

A physical information storage area in an information storage device may be divided into one or more logical storage areas (logical areas) and managed. For example, data to be written into a logical area is encrypted using an encryption key that is associated with the logical area. As a result, stored information can be protected for each logical area.

Recently, a technology of accessing an information storage device via a network has also been used.

For example, a user who uses a host device such as a computer is permitted to access one logical area assigned to the user among one or more logical areas. When an unauthorized program intrudes into software executed in the host device, an information storage device (for example, an assigned logical area) is illegally accessed, which may cause data destruction or data theft.

Therefore, it is required to achieve a new technology capable of preventing unauthorized access to an information storage device.

BRIEF DESCRIPTION OF THE DRAWINGS

FIG. 1 is a block diagram illustrating an example of a configuration of an information storage device according to a first embodiment.

FIG. 3A is a diagram illustrating an example of a correspondence relationship between a logical area and reliability base information managed by the information storage device according to the first embodiment.

FIG. 3B is a diagram illustrating an example of reliability base information managed by the information storage device according to the first embodiment.

FIG. 4 is a diagram illustrating an example of a configuration of an authorization information table managed by the information storage device according to the first embodiment.

FIG. 5 is a diagram illustrating another example of a configuration of an authorization information table managed by the information storage device according to the first embodiment.

FIG. 7 is a block diagram illustrating an example of a configuration of an information storage device according to a third embodiment.

FIG. 8 is a diagram illustrating an example of an I/O command and an identifier corresponding to the I/O command that are stored in a storage unit in the information storage device according to the third embodiment.

FIG. 15 is a block diagram illustrating an example of a configuration of a communication interface according to an eighth embodiment.

DETAILED DESCRIPTION

Figure 2:
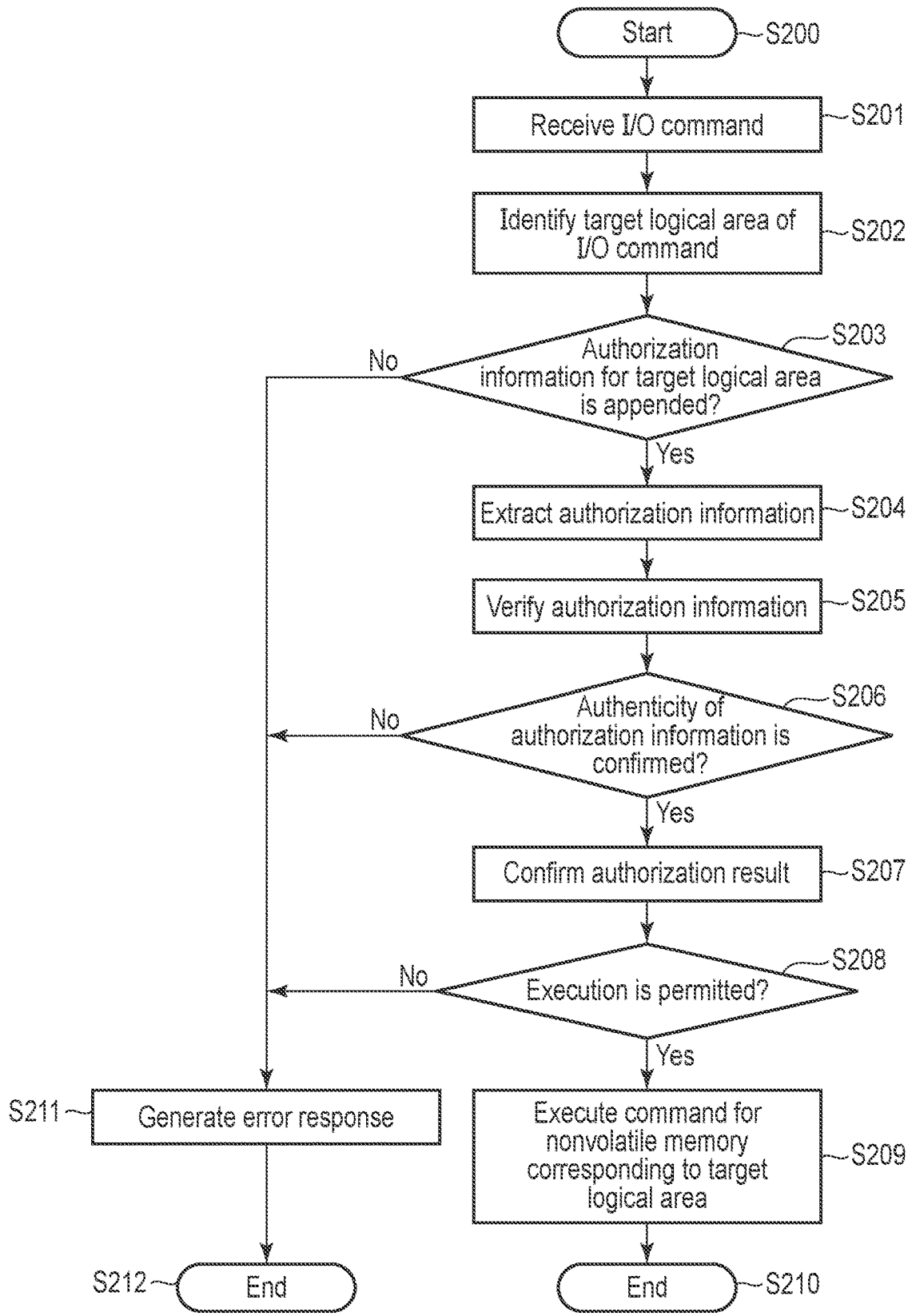
FIG. 2 is a flowchart illustrating an operation sequence of the information storage device according to the first embodiment.

Various embodiments will be described hereinafter with reference to the accompanying drawings.

In general, according to one embodiment, an I/O command control device is configured to connect to a storage device that divides a physical area into one or more logical areas and performs reading and writing of information based on an I/O command for each of the one or more logical areas, the physical area storing information to be read and information that is written. The I/O command control device includes an I/O command interface, a control command interface, an authorization information reception unit, an authorization information verification unit, an authorization applying unit, a reliability base control unit, and a storage control unit. The I/O command interface receives the I/O command from an external control entity. The control command interface transmits a control command for controlling the storage device to the storage device, the control command being generated based on the I/O command. The authorization information reception unit receives authorization information via the I/O command interface, the authorization information indicating whether execution of the I/O command is permitted and being protected from modification performed by a sender of the I/O command. The authorization information verification unit verifies, for each of the logical areas, whether the received authorization information is not modified and is issued from a known authorization server, and when the received authorization information is not modified and is issued from the known authorization server, verifies whether the received authorization information permits execution of the I/O command. The authorization applying unit permits or inhibits execution of the I/O command or the control command generated from the I/O command with respect to a logical area that is an execution target of the I/O command, in accordance with an authorization result indicating whether the received authorization information permits execution of the I/O command. The reliability base control unit acquires reliability base information that is used by the authorization information verification unit to verify whether the received authorization information is not modified and is issued from the known authorization server, and maintains and manages the acquired reliability base information. The storage control unit generates the control command based on the I/O command.

First Embodiment

An information storage device 100 according to a first embodiment has a configuration in which an authorization processing function of determining whether to execute an I/O command and a reliability base function of maintaining reliability information necessary for confirming authenticity of the determination are added to a solid state drive (SSD) that stores information using a NAND flash memory. A configuration in which an SSD having the authorization processing function and the reliability base function is connected to a host computer will be described below as an example. The configuration of the SSD and the connection form between the SSD and the host computer are not limited to those in this example.

FIG. 1 is a block diagram illustrating an example of a configuration of the information storage device 100 according to the first embodiment. As illustrated in FIG. 1, the information storage device 100 of the present embodiment includes a control unit 101, a volatile memory unit 102, a nonvolatile auxiliary memory unit 103, and nonvolatile memories 104A to 104D. The control unit 101 is connected to the nonvolatile memories 104A to 104D via a nonvolatile memory interface (I/F) 105. The connection between the control unit 101 and the nonvolatile memories 104A to 104D may be in a state in which the control unit 101 and the nonvolatile memories 104A to 104D are directly connected to each other, or may be in a state in which the control unit 101 and the nonvolatile memories 104A to 104D are indirectly connected to each other with, for example, a transistor or a resistor interposed therebetween. The control unit 101 is also connected to a host computer (not illustrated) via a host interface (I/F) 106.

The control unit 101 controls operation of the information storage device 100. The control unit 101 may be implemented as a dedicated circuit as a whole, may be implemented by combining a dedicated circuit and a general-purpose processing unit (such as a CPU), or may be implemented only by a general-purpose processing unit. In the general-purpose processing unit, each function described in the present specification is performed by executing software implementing necessary functions.

The control unit 101 has a function of dividing a physical storage area (hereinafter, also referred to as a physical area) configured by the nonvolatile memories 104A to 104D into one or more logical areas 107A to 107N to use. The host computer (not illustrated) connected via the host I/F 106 recognizes each logical area as an independent storage area. The logical areas 107A to 107N are achieved as, for example, name spaces defined by NVM Express™ (NVMe™).

The control unit 101 includes: an authorization information extraction unit 110 that extracts authorization information appended to an I/O command received via the host I/F 106; an authorization information verification unit 111 that verifies the extracted authorization information; an authorization result applying unit 112 that applies the verification result of the authorization information; a reliability base control unit 113 that acquires, maintains, and manages reliability base information necessary for verification of the authorization information; an embedded volatile memory unit 114 configured to store a small amount of information inside the control unit 101; and a nonvolatile memory control unit 115-1 that actually writes and reads information to and from the nonvolatile memories 104A to 104D via the nonvolatile memory I/F 105. The nonvolatile memory control unit 115-1 functions as a storage control unit, and generates a control command for controlling the nonvolatile memories 104A to 104D on the basis of the I/O command.

In actual application, components other than the described components may be included in the information storage device 100, but are not directly related to the present invention, and thus are omitted. As described above, these internal components may be achieved by a dedicated circuit, or may be achieved by a general-purpose processing unit and software operating thereon.

The nonvolatile memories 104A to 104D are nonvolatile memories for storing information, for example, NAND flash memories. Alternatively, the nonvolatile memories 104A to 104D may be, for example, a phase-change memory (PCM), a resistive random access memory (ReRAM), or a magneto-resistive random access memory (MRAM), or memories that store information in a magnetic material such as a hard disk drive (HDD). Here, the four nonvolatile memories are used, but the number is not limited to this example.

The volatile memory unit 102 is, for example, a dynamic random access memory (DRAM). The volatile memory unit 102 is used to store control information necessary for operation of circuits and software in the control unit 101. The volatile memory unit 102 is a memory used to temporarily store information that is to be written into the nonvolatile memories 104A to 104D and is received via the host I/F 106 and information read from the nonvolatile memories 104A to 104D.

The nonvolatile auxiliary memory unit 103 is a nonvolatile memory unit used for the purpose of, for example, storing initialization information necessary for the initial operation of the control unit 101. This component is an additional component and may not necessarily be used. In a case where this component is not used, it can be substituted by storing the initialization information and the like in the nonvolatile memories 104A to 104D.

The nonvolatile memory I/F 105 is a storage interface that connects the control unit 101 and storage devices such as the nonvolatile memories 104A to 104D. The nonvolatile memory I/F 105 functions as a control command interface for transmitting a control command for controlling the storage device to the storage device. For example, in a case where the nonvolatile memories 104A to 104D are NAND flash memories, the nonvolatile memory I/F 105 is implemented on the basis of specifications of Toggle and/or ONFi. That is, the nonvolatile memory I/F 105 is used to transmit commands for controlling the nonvolatile memories 104A to 104D to the nonvolatile memories 104A to 104D, and is used to transmit and receive data between the control unit 101 and the nonvolatile memories 104A to 104D.

The host I/F 106 is a local bus interface that connects the information storage device 100 and the host computer (not illustrated). The host I/F 106 receives an I/O command from the host computer, and transmits and receives data between the information storage device 100 and the host computer, according to a protocol of the local bus. More specifically, the host I/F 106 adopts a shape/electrical specification of SATA, PCI Express™ M.2, PCI Express (PCIe™), etc., and exchanges control information and read/write target information with the host computer using a control protocol such as SATA or NVMe. Note that the shape of a connector and electrical specification, and control protocol are not limited, and are selected appropriately according to the embodiment. The host I/F 106 functions as an I/O command interface that receives an I/O command from an external control entity such as a host computer.

(Operation Sequence)

FIG. 2 is a flowchart illustrating an operation sequence of the information storage device 100. This operation sequence starts when the host I/F 106 receives an I/O command issued by the host computer (step S201). The authorization information extraction unit 110 of the information storage device 100 identifies a logical area which is an execution target of the I/O command with respect to the I/O command received via the host I/F 106 (step S202). Specifically, the authorization information extraction unit 110 identifies a logical area which is an execution target of the I/O command, for example, by using a namespace identifier (namespace ID) designated in the I/O command. The I/O command may be received for each logical area which is an execution target. Next, it is confirmed whether authorization information for the identified logical area is appended to the I/O command (step S203). This authorization information indicates whether execution of the corresponding I/O command is permitted in the corresponding logical area. A method of appending the authorization information to the I/O command will be described later.

In a case where the authorization information is not appended to the I/O command (No in step S203), an error occurs, and the process ends without executing the I/O command (steps S211 and S212). Specific processing when an error occurs will be described later.

When the authorization information is appended to the I/O command, the processing is continued (Yes in step S203), and the authorization information extraction unit 110 extracts the authorization information from the I/O command (step S204). Next, the authorization information extraction unit 110 sends the identifier of the logical area which is a target of the I/O command, the received I/O command, and the extracted authorization information to the authorization information verification unit 111. In this case, the authorization information extraction unit 110 may generate an identifier (ID #2) capable of identifying the I/O command on the basis of the I/O command and the logical area so as to obtain a correspondence relationship between the authorization information and the logical area and the I/O command, and store the I/O command and the identifier (ID #2) in the embedded volatile memory unit 114 (or the volatile memory unit 102) in a state where the I/O command and the identifier (ID #2) are associated with each other. The authorization information extraction unit 110 generates, for example, a hash value of a header portion of an NVMe packet for transferring the I/O command as an identifier capable of identifying the I/O command. The header portion includes, for example, a command identifier (command ID) and a namespace ID that correspond to the I/O command.

The authorization information verification unit 111 verifies whether the authorization information is not modified and whether the authorization information is issued from a known authorization server (steps S205 and S206). At this time, an authorization server that can grant authorization to the logical area can be limited. The correspondence relationship is stored in the embedded volatile memory unit 114 (or the volatile memory unit 102). Details of the verification method of the authorization information will be separately described. The modification of the authorization information includes modification for abuse of the authorization information, that is, for tampering of the authorization information.

As a result of verifying the authorization information, when the authenticity of the authorization information is not confirmed (No in step S206), an error occurs, and the process ends without executing the I/O command (steps S211 and S212). As a result of verifying the authorization information, when the authenticity of the authorization information is confirmed, that is, when the authorization information is not modified and is issued from a known authorization server (Yes in step S206), the authorization information verification unit 111 verifies the content of the authorization information and obtains an authorization result (information indicating whether execution is permitted or inhibited) as a verification result of the authorization information (step S207). The verification processing in step S207 is processing of verifying whether the authorization information permits execution of the corresponding I/O command, and details of the verification processing will be described later.

In step S207, the authorization information verification unit 111 sends the I/O command, the identifier of the target logical area, and the verification result of the authorization information (authorization result indicating whether the I/O command can be executed) to the authorization result applying unit 112. In this case, the authorization information verification unit 111 may generate an identifier (ID #1) that can identify the I/O command and the target logical area that correspond to the authorization information in accordance with the authorization information, and then store the verification result of the authorization information (authorization result) and the identifier (ID #1) in the embedded volatile memory unit 114 (or the volatile memory unit 102) in a state where the authorization result and the identifier (ID #1) are associated with each other. The authorization information verification unit 111 generates the identifier (ID #1) by a method similar to the method of generating the identifier (ID #2) that can identify the I/O command by the authorization information extraction unit 110.

The I/O command and the target logical area, and the authorization information may be separately received via the host I/F 106. In this case, the authorization information may include the ID #1 that can identify the corresponding I/O command and target logical area. In this case, the authorization information verification unit 111 extracts the ID #1 from the authorization information, and stores the verification result of the authorization information (authorization result) and the identifier (ID #1) in the embedded volatile memory unit 114 (or the volatile memory unit 102) in a state where the authorization result and the identifier (ID #1) are associated with each other.

When, as a result of the verification of the authorization information, the authorization information does not permit execution of the corresponding I/O command (No in step S208), that is, when the authorization result indicates inhibition of the execution, the authorization result applying unit 112 performs control not to execute the I/O command (or a control command generated from the I/O command). That is, when the authorization information does not permit execution of the corresponding I/O command, an error occurs, and the process ends without execution of the I/O command (steps S211 and S212).

As a result of the verification of the authorization information, when the authorization information permits execution of the corresponding I/O command in the corresponding logical area (Yes in step S208), that is, when the authorization information permits execution of the corresponding I/O command, the authorization result applying unit 112 sends the I/O command and the identifier of the target logical area to the nonvolatile memory control unit 115-1, and performs control such that the I/O command (or the control command generated from the I/O command) is executed (step S209). In step S209, the nonvolatile memory control unit 115-1 that has received the I/O command generates a control command from the I/O command, and executes the generated control command. For example, when the I/O command is a read command, the nonvolatile memory control unit 115-1 generates a control command that designates a physical address in the nonvolatile memories 104A to 104D and instructs reading of data, in accordance with the read command.

In a case where the identifier (ID #2) is stored in the embedded volatile memory unit 114 and a pair of the verification result and the identifier (ID #1) is stored in the embedded volatile memory unit 114, the authorization result applying unit 112 may determine, for example, whether the identifier (ID #1) matching the identifier (ID #2) is stored in the embedded volatile memory unit 114.

When the identifier (ID #1) matching the identifier (ID #2) is stored in the embedded volatile memory unit 114 and the authorization result associated with the identifier (ID #1) indicates "permission of execution", the authorization result applying unit 112 permits execution of the I/O command identified by the identifier (ID #2) (or the control command corresponding to the I/O command) and performs control so that the I/O command (or the control command) is executed.

When the identifier (ID #1) matching the identifier (ID #2) is stored in the embedded volatile memory unit 114 and the verification result associated with the identifier (ID #1) indicates "inhibition of execution", the authorization result applying unit 112 inhibits execution of the I/O command identified by the identifier (ID #2) (or the control command corresponding to the I/O command) and performs control so that the I/O command (or the control command) is not executed.

When authorization information is not appended to the received I/O command, the identifier (ID #1) matching the identifier (ID #2) is not stored in the embedded volatile memory unit 114. Therefore, when the identifier (ID #1) matching the identifier (ID #2) is not stored in the embedded volatile memory unit 114, the authorization result applying unit 112 inhibits execution of the I/O command identified by the identifier (ID #2) (or the control command corresponding to the I/O command) and performs control so that the I/O command (or the control command) is not executed.

Although processing of returning a response to the I/O command to the host computer is not described here, the response to the I/O command permitted to be executed is processed in the same manner as the existing SSD. Although it is described that authorization information and an I/O command are sent between functional components in the series of processes, information may be sent using an information exchange unit (a register, some internal bus, or the like) between the functional components, or may be sent via the embedded volatile memory unit 114. At that time, a structure may be employed in which a queue may be created in the embedded volatile memory unit 114, and sequentially read from information stored at the head of the queue, or a structure may be employed in which the functional component at the preceding stage stores information in the embedded volatile memory unit 114, and the functional component at the subsequent stage is notified of the location where the information is stored.

In a case where the I/O command and the target logical area, and the authorization information are separately received via the host I/F 106, the authorization information extraction unit 110 may function as an authorization information reception unit that receives both the authorization information and the I/O command, or the authorization information extraction unit 110 that receives the authorization information and another component may function as authorization information reception units that receive both the authorization information and the I/O command. Upon receiving the I/O command via the host I/F 106, the authorization information reception unit generates the identifier (ID #2) that can identify the I/O command on the basis of the I/O command and the target logical area, and stores the I/O command and the identifier (ID #2) in the embedded volatile memory unit 114 (or the volatile memory unit 102) in a state where the I/O command and the identifier (ID #2) are associated with each other.

In the information storage device 100, the nonvolatile memory control unit 115-1 performs garbage collection, wear leveling, patrol, or creation or deletion of each of the logical areas 107A to 107N as internal operations for maintaining and managing the nonvolatile memories 104A to 104D (or the logical areas 107A to 107N). When performing the garbage collection, wear leveling, patrol, and creation and deletion of each of the logical areas 107A to 107N, the nonvolatile memory control unit 115-1 generates control commands used for performing the garbage collection, wear leveling, patrol, or creation or deletion of each of the logical areas 107A to 107N, and transmits the generated control commands to the nonvolatile memories 104A to 104D (or the logical areas 107A to 107N). Therefore, the authorization result applying unit 112 excludes these control commands for the internal operations from the application target command of the authorization processing, and permits execution of these control commands for the internal operations regardless of the authorization information.

(Handling of Authorization Information in I/O Command)

Next, a relationship between an I/O command and authorization information will be described. In implementation of the information storage device 100, the authorization information is appended to a reservation field, an extension header, meta information, and the like of the I/O command, thereby transmitted to the control unit 101 together with the I/O command and the target logical area. For example, the authorization information may be appended to a meta information field of the NVMe, a TCP option of the NVMe over TCP, an extension header of IPv6, or the like. In this case, the information storage device 100 receives the I/O command to which the authorization information is appended, from the host computer as the control entity.

Only authorization information indicating whether execution of a certain I/O command is permitted may be transmitted to the information storage device 100 by using a command different from the I/O command. In this case, since the authorization information extraction unit 110 separately receives the I/O command and the authorization information, it is desirable to use the authorization information including an identifier for identifying the I/O command corresponding to the authorization information so as to be able to find the corresponding I/O command. Even in a case where the authorization information is transmitted to the information storage device 100 separately from the I/O command, a command obtained by independently extending an NVMe command, meta information of an existing NVMe command, a dedicated packet for the authorization information, a TCP option of NVMe over TCP, an extension header of IPv6, and the like can be used to transmit the authorization information.

When the authorization information is transmitted using a command different from the I/O command, another communication path may be used. For example, when NVMe over TCP is used, normal NVMe over TCP communication may be performed through a TCP connection and intensively exchanging of authorization information may be performed through another connection. A communication protocol other than TCP (for example, User Datagram Protocol (UDP) or Quick UDP Internet Connections (QUIC)) may be used for communication of the authorization information.

For transmission and reception of the authorization information, one method may be used in a unified manner in the information storage device 100, or a different method may be used for each logical area. The transmission and reception method of the authorization information including separate use for each logical area may be determined at the stage of initial setting of the information storage device 100 and the connection partner, or one method defined as a storage protocol may be fixedly used.

(Verification of Authorization Information)

Next, verification of authorization information will be described. Upon receiving authorization information, the authorization information verification unit 111 confirms that the content of the authorization information is not modified using reliability base information stored so as to correspond to a logical area (that is, reliability base information for each logical area). There are several specific methods for the confirmation.

A first method is a method of using a hash value accompanying the authorization information. This hash value is generated by an authorization server that is a generator of the authorization information and is appended to the authorization information. The hash value is included in, for example, the authorization information. The authorization information verification unit 111 generates a hash value from the authorization information and compares the generated hash value with a hash value accompanying the authorization information. If these hash values do not match each other, an error is determined. A hash function defined in advance between the authorization server and the information storage device 100 is used to generate the hash value by the authorization information verification unit 111.

The second method is a method using a cryptographic hash. In this method, the information storage device 100 shares confidential information (common key) with an authorization server that is a generator of the authorization information in advance, and uses a hash value in consideration of the confidential information. Since the authorization server having no confidential information cannot calculate an authentic cryptographic hash value, a cryptographic hash value has an effect of authenticating the authorization server. More specifically, the authorization information includes, for example, a hash value of the authorization information encrypted with the common key. The authorization information verification unit 111 decrypts the encrypted hash value of the authorization information with the common key, thereby acquiring the hash value. The authorization information verification unit 111 generates a hash value of the authorization information. The authorization information verification unit 111 compares the generated hash value with the hash value acquired by decoding. If these hash values do not match each other, an error is determined.

A third method is a method using a digital certificate and an electronic signature. The authorization information verification unit 111 receives a digital certificate indicating the source from the authorization server. The authorization server generates an electronic signature by using a private key that corresponds to a public key included in the digital certificate and appends the generated electronic signature to the authorization information. In this case, an electronic signature for a hash value that is calculated from the authorization information may be created using a secret key and appended to the authorization information. Upon receiving the authorization information including the electronic signature, the authorization information verification unit 111 processes the electronic signature by using the public key included in the digital certificate and checks the generator of the authorization information. More specifically, the authorization information verification unit 111 decrypts the electronic signature (for example, a hash value of the authorization information encrypted with the secret key) with the public key, thereby acquiring the hash value. The authorization information verification unit 111 generates a hash value of the authorization information. The authorization information verification unit 111 compares the generated hash value with the hash value acquired by decoding. If these hash values do not match each other, an error is determined. In this method, it can be confirmed that the authorization server is authenticated by using public key cryptography, and that the authorization information is not modified.

As described above, for example, a modification prevention technique such as encryption or cryptographic hash is applied to the authorization information. As a result, the authorization information is protected so that the sender of the I/O command such as the host computer cannot be modified. When the authorization information is received via the host I/F 106, the authorization information verification unit 111 verifies the authenticity of the received authorization information, that is, whether the received authorization information is not modified and whether the authorization information is issued from a known authorization server, using the reliability base information. When the authenticity of the received authorization information is confirmed, the authorization information verification unit 111 verifies whether the authorization information permits execution of the I/O command. On the basis of the authorization result indicating whether the authorization information permits execution of the I/O command, the authorization result applying unit 112 permits or inhibits execution of the I/O command.

As described above, the reliability base information is configured to correspond to each logical area. FIG. 3A is an example of the correspondence relationship between the logical area and the reliability base information that is stored in the embedded volatile memory unit 114 or the volatile memory unit 102. Although illustrated in a table format here, the data is actually stored in an appropriate structure. A table 300 includes reliability base information for a logical area 1, a column 301 indicates an identifier of an authorization server (authorization server ID) that is authorized to grant authorization, a column 302 indicates information necessary for authenticating the authorization server that is identified by the authorization server ID, and a column 303 indicates authentication information of own device for authenticating itself to the authorization server that is identified by the authorization server ID.

In this example, there are two entries illustrated in a row 304 and a row 305, and the row 304 indicates that the authorization server is "auth1.example1.com", the root certificate RootCA 1 is used as information for verifying the server certificate presented by the authorization server, and DigiSign 1 is used as the digital certificate for authenticating itself to the authorization server. The same applies to the row 305. However, "–" in the column 302 indicates that there is no specific information for verifying the certificate presented by the authorization server.

Although the table 300 is the reliability base information of the logical area 1, the tables may be similarly defined for logical areas 2 to N, respectively.

As a result, the authorization processing of verifying the authorization information in the information storage device 100 can be performed for each logical area. Therefore, even when malware intrudes into the software of the host computer and even when an application, an OS, or the like that issues a command is different depending on the logical area, it is possible to prevent data stored in the information storage device 100 from being destroyed or stolen.

The authorization servers permitted to grant authorization to the logical areas 1 to N may be the same authorization server or different authorization servers. Different reliability base information may be used in each of the logical areas 1 to N, or common reliability base information may be used.

FIG. 3B illustrates an example of the reliability base information stored in the embedded volatile memory unit 114 or the volatile memory unit 102 in a case where the reliability base information common to the logical areas 1 to N is used. The configuration of the table 300 illustrated in FIG. 3B is similar to the configuration of the table 300 indicating the reliability base information for the logical area 1 described above with reference to FIG. 3A. As a result, the authorization processing of verifying the authorization information in the information storage device 100 can be performed using the reliability base information common to the logical areas.

(Acquisition of Information Necessary for Verification of Authorization Information)

Information such as confidential information (the above-described second method) and a digital certificate (the above-described third method) used by the authorization information verification unit 111 to verify the authorization information is stored in the embedded volatile memory unit 114 or the nonvolatile auxiliary memory unit 103 by the reliability base control unit 113. Which one is used to store depends on a design. Information such as confidential information and a digital certificate used for verification of authorization information is stored as, for example, the column 302 of the table 300 in FIG. 3A or FIG. 3B described above (that is, information required for authenticating the authorization server). There is multiple methods for the reliability base control unit 113 to acquire the confidential information or the digital certificate.

The first method is a method of storing one or more pieces of information in advance at the time of factory shipment of the information storage device 100 (since the information is stored in advance, the information is inevitably stored in the nonvolatile auxiliary memory unit 103). Verification of the authorization information is performed directly using this information stored in advance. In the case of using this method, it is necessary to assign the logical areas at the time of factory shipment in order to use the authorization server separately for each logical area. Therefore, there is a high possibility that flexibility is lacking from the viewpoint in practical use.

The second method is an extension of the first method. With the information stored in advance as a starting point, information exchange means via the host computer is established with a reliable partner, and new confidential information or a new digital certificate is obtained via the means. This processing may be performed during initialization operation of the host computer, or may be started when specific operation (for example, starting a specific application in a specific environment, pressing a specific button prepared in the information storage device 100, or the like) is performed on the host computer. Examples of the information exchange means include one that is completed only between the host computer and the information storage device 100 (for example, a protocol obtained by extending NVMe or PCIe or simples commands executed on a local bus (commands using SMBus, I2C, or the like)), and one that interacts with the outside via various interfaces included in the host computer (for example, directly communicating with an external authorization server that generates authorization information via a network interface included in the host, or receiving input of information via a keyboard, a mouse, or the like included in the host). In this method, information regarding a specific server such as a bootstrap server is stored at the time of factory shipment, and necessary information for each logical area can be obtained and set via the server. Therefore, the concern about the first method can be solved.

The third method is a method in which the information storage device 100 includes another interface (which may be dedicated to reception) different from the host I/F 106, and receives information through the interface. The interface may be enabled only when some condition is satisfied. As the condition, for example, it is conceivable that, when a specific application is executed on the host computer and a specific command is received via the host I/F 106, a button prepared in the information storage device 100 is pressed. The reliability base control unit 113 detects that the condition is satisfied, and then performs a process of receiving necessary information via this interface and storing the information in the embedded volatile memory unit 114 or the nonvolatile auxiliary memory unit 103. The condition and the received information include the identifiers of one or more logical areas in addition to the reliability base information. As a result, the reliability base information can be set for the logical areas at a time. The logical area may be specified using another condition (for example, pressing a button corresponding to a logical area for which reliability base information is desired to be set from a plurality of buttons, specifying the logical area by a DIP switch, or the like) without adding an identifier to the information to be received.

A fourth method is a method of downloading the confidential information or the digital certificate from the host computer together with the firmware at the time of initialization of the information storage device 100. When the firmware is received via the host I/F 106, the authorization information extraction unit 110 separates the firmware from the confidential information/digital certificate, sends the firmware to the nonvolatile memory control unit 115-1, and sends the confidential information/digital certificate to the reliability base control unit 113. It is assumed that information to be downloaded is set in advance for each logical area.

By these methods, when initializing the information storage device 100 or during operation of the information storage device 100, the reliability base control unit 113 acquires at least one of a digital certificate including a public key, and a common key as reliability base information via the host I/F 106. The reliability base control unit 113 newly stores the acquired reliability base information in the embedded volatile memory unit 114 or the nonvolatile auxiliary memory unit 103, or updates the reliability base information already stored in the embedded volatile memory unit 114 or the nonvolatile auxiliary memory unit 103 with the acquired reliability base information.

(Confirmation of Authorization Information)

After the authorization information verification unit 111 has confirmed the authenticity of the authorization information, that is, after it has been confirmed that the authorization information is not modified and that the authorization information is issued from a known authorization server, the authorization information verification unit 111 checks information included in the authorization information. The information to be checked includes an authorization result (whether execution of the corresponding I/O command is permitted), an authorization time, a valid period of the authorization information (here, a period is designated, but an authorization deadline based on date and time may be designated), a referable period (in the case of reading)/a storage period (in the case of writing) of the information to be authorized, and the like (the referable period/the storage period of the information is optional and may not be included). The result of the authorization is information indicating permission or inhibition. The authorization time is information indicating a time at which the authorization server performs the authorization determination or a time at which the authorization server generates the authorization information. The valid period of the authorization information is information indicating a time period during which the authorization information including this information is determined to be valid, and the corresponding I/O command group does not need to be authorized again within the time period specified. The corresponding I/O command is an I/O command group related to the I/O command corresponding to the authorization information. More specifically, the corresponding I/O command group include, for example, one or more I/O commands whose type is the same as the I/O command corresponding to the authorization information, and that are used for accessing the same logical area as the logical area accessed by the I/O command corresponding to the authorization information. For example, the corresponding I/O command group includes one or more I/O commands each accessing the same logical address as the logical address (or the logical address range) in the logical area accessed by the I/O command corresponding to the authorization information or one or more logical addresses (or the logical address range) continuous to the logical address. The logical address is an address used by the host for addressing the information storage device 100. Therefore, for example, when first authorization information corresponding to a first read command is confirmed, authorization information may not be further acquired (confirmed) within the valid period of the first authorization information for one or more read commands for reading information from one or more logical addresses, respectively, that are continuous with the logical address from which information is read by the first read command. The referable period/storage period is information indicating a time during which the read information can be referred to by a read destination (for example, a host) or a time during which the read information is stored in the information storage device 100.

When the authorization information verification unit 111 identifies each piece of the above-described information from the authorization information, the authorization information verification unit 111 stores the information in the embedded volatile memory unit 114 or the volatile memory unit 102. This information is stored as, for example, an authorization information table as illustrated in FIG. 4. Here, each piece of authorization information is sorted in order of expiration date, but may be sorted in order of reception of each piece of authorization information, or in a case where I/O commands have identifiers having order, each piece of authorization information may be sorted in the order of the I/O commands. The table of FIG. 4 includes an expiration date (column 400), a target logical area (column 401), a target I/O command (column 402), an authorization target object (column 403), an authorization time (column 404), and a referable period/storage period (column 405), but this configuration is an example.

The expiration date (column 400) is an expiration date calculated on the basis of the authorization time included in the authorization information and the expiration period of the authorization information. The authorization information may be notified together with information indicating an authorization deadline, and in this case, the information indicating the authorization deadline may be stored as it is in the authorization information table as the expiration date (column 400).

The target logical area (column 401) is information for identifying a logical area which is an execution target of the I/O command.

The target I/O command (column 402) is information indicating the type of I/O command such as a READ/WRITE command. Here, the READ/WRITE command is described as an example of the target I/O command, but examples of the target I/O command may include a management command used for reset, firmware download, update of information regarding security, or the like.

The authorization target object (column 403) is information indicating a target to be accessed by the target I/O command (column 402). Although the object is described here, the target to be indicated may change according to the format of the information stored in the information storage device 100. If the information storage device 100 is an object storage that stores unstructured data, the authorization target object indicates an object or an object group. If the information storage device 100 is a block storage, the authorization target object indicates a specific block or a continuous block group, or at least one block group identified using information managed by a higher file system. Since the information for the logical area can be identified by the column 401, the authorization target object (column 403) may be information representing a relative positional relationship in the logical area. Here, a method of identifying the block group using the information managed by the file system, and including information of the identified block group in the authorization information is not specified.

The authorization time (column 404) is information indicating the authorization time included in the authorization information. The referable period/storage period (column 405) is similarly information indicating the referable period/storage period included in the authorization information. However, as similar to the expiration date (column 400), the referable period/storage period may be a deadline specified by date and time instead of the period.

In FIG. 4, two pieces of authorization information are stored in a row 410 and a row 411, but a new entry is added to the authorization information table each time the authorization information verification unit 111 verifies the new authorization information. When the authorization information verification unit 111 adds new authorization information, refers to the authorization information table, or performs periodic entry deletion processing, an entry that has reached the expiration date is deleted from the authorization information table.

In FIG. 4, an example in which a series of pieces of authorization information is stored in one authorization information table has been described, but the pieces of authorization information may be divided into multiple tables and stored. For example, some pieces of authorization information used most recently may be stored in the embedded volatile memory unit 114, and other pieces of authorization information (or all pieces of authorization information including the pieces of authorization information stored in the embedded volatile memory unit 114) may be stored in the volatile memory unit 102. At this time, the two tables may have the same configuration or different configurations. For example, to minimize information stored in the embedded volatile memory unit 114, only an expiration date, a target logical area, a target I/O command, and an authorization target object may be stored in a table in the embedded volatile memory unit 114 (FIG. 5). That is, (A) of FIG. 5 illustrates an example of minimum information stored in the embedded volatile memory unit 114, and (B) of FIG. 5 illustrates an example of all authorization information stored in the volatile memory unit 102. For a method of determining whether to store the information in the embedded volatile memory unit 114 and a method of selecting the authorization information to be deleted from the embedded volatile memory unit 114, various cache control algorithms such as least recently used (LRU) and least frequently used (LFU) may be applied. The control of the cache algorithm may be implemented inside the authorization information verification unit 111.

(Processing of Error)

In a series of the sequences, processing in a case where an error occurs will be supplemented. In each case where an error occurs (No in S203, No in S206, No in S208), the type of error returned to the host computer may depend on implementation. For example, an error indicating an unauthorized I/O command may be notified, or a simple command error may be notified as. However, it requires attention since an attacker may obtain some information when notifying the outside that there is a mistake in the authorization information or that the I/O command is not authorized.

As described above, in the first embodiment, the control unit 101 directly connected to the nonvolatile memories 104A to 104D that are controlled as storage devices by the nonvolatile memory control unit 115-1 functions as an I/O command control device configured to permit or inhibit execution of an I/O command (or control command) on the basis of the authorization information received via the host I/F 106. In particular, the control unit 101 configures the logical areas 107A to 107N configured on the nonvolatile memories 104A to 104D as the I/O command execution target areas, and verifies the authorization information using different reliability base information for each of the logical areas, thereby becoming the I/O command control device configured to permit or inhibit the execution of the I/O command for each logical area.

Summary of First Embodiment

The above is the first embodiment. The information storage device 100 has a function of receiving an I/O command to which authorization information is appended and verifying the authenticity of the authorization information and a function of acquiring, maintaining, and managing information necessary for verifying the authenticity for each logical area configured in the information storage device, so that the information storage device 100 can determine whether to execute the I/O command for each logical area without depending on control on the host side. As a result, even when the software on the host is intruded by an unauthorized program, it is possible to maintain the operation of determining whether to execute the I/O command on the basis of the authorization information having the authenticity. The information storage device 100 may receive the authorization information indicating whether the execution of the I/O command is permitted separately from the I/O command.

Therefore, in the information storage device 100 having the logical areas for multipurpose or enabling different users to use, different authorization determinations are performed in the logical areas, respectively, so that it is possible to cope with an environment in which various workloads are executed while enhancing safety. Further, since different authorization servers can be used for the logical areas, respectively, different requests for safety can be made for each user.

Second Embodiment (Functional Block Diagram)

Figure 6:
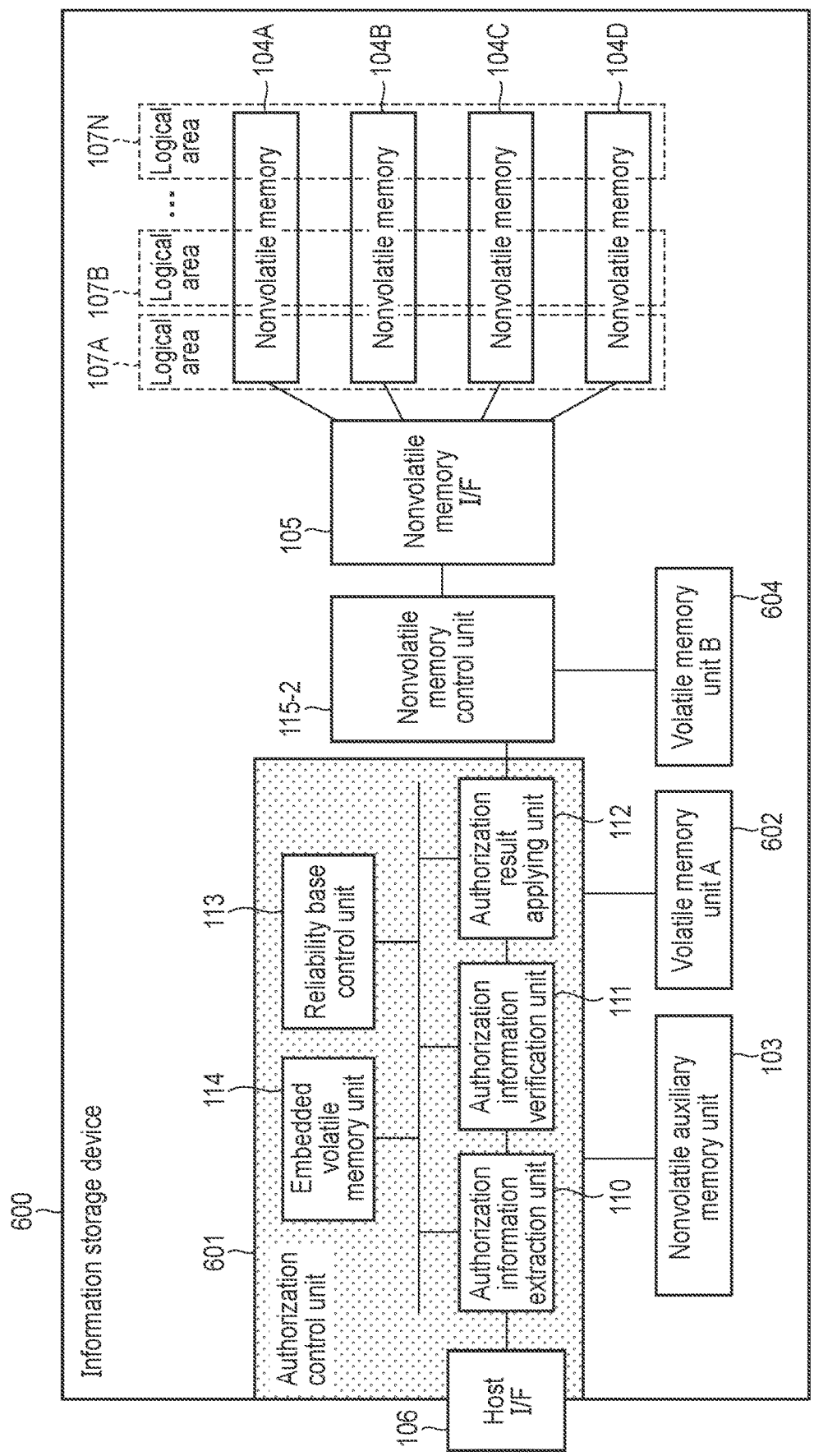
FIG. 6 is a block diagram illustrating an example of a configuration of an information storage device according to a second embodiment.

Next, a second embodiment obtained by modifying the first embodiment will be described. FIG. 6 is a block diagram illustrating an example of a configuration of the second embodiment. In the drawing, the same functions and configurations as those in FIG. 1 are denoted by the same numerals as those in FIG. 1. The largest change in the drawing is that the control unit 101 in FIG. 1 is separated into an authorization control unit 601 and a nonvolatile memory control unit 115-2. For the nonvolatile memory control unit 115-2, a new component is added between the nonvolatile memory control unit 115-2 and the host I/F 106. As a result, an information storage device 600 according to the second embodiment can be obtained by adding a function of determining permission/inhibition of execution of an I/O command determination on the basis of authorization information to an existing information storage device without making a large design change.

In FIG. 6, in accordance with the separation of the control unit 101, the volatile memory unit 102 is also separated into a volatile memory unit (A) 602 and a volatile memory unit (B) 604. However, this separation is not necessarily essential. When a volatile memory unit is arranged at a position easily available from the authorization control unit 601 and the nonvolatile memory control unit 115-2 and can be appropriately used, the volatile memory unit 102 may not be separated into the volatile memory unit (A) 602 and the volatile memory unit (B) 604. When the authorization control unit 601 can be mounted using only the embedded volatile memory unit 114 as an operation memory, the volatile memory unit (A) 602 is unnecessary.

(Operation Sequence)

Since a series of operation sequences of the second embodiment is the same as that of the first embodiment, the description thereof will be omitted.

Summary of Second Embodiment

By separately mounting the authorization control unit 601 and the nonvolatile memory control unit 115-2 as described above, it is possible to add the control function based on authorization information similar to that of the first embodiment to an existing information storage device without making a large change.

Third Embodiment (Functional Block Diagram/Operation Sequence)

Next, a third embodiment obtained by further modifying the first embodiment will be described. FIG. 7 is a block diagram illustrating an example of a configuration of an information storage device 700 according to the third embodiment. The third embodiment is different in that a path directly connecting the authorization information extraction unit 710 and the authorization result applying unit 712 is provided. In the first embodiment, the processing is continuously performed using the internal bus of the control unit 101 or the like, but in the third embodiment, authorization information extracted by the authorization information extraction unit 710 is sent to the authorization information verification unit 111, and the information included in the I/O command other than the authorization information is directly sent to the authorization result applying unit 712.

In the third embodiment, the authorization information verification unit 111 may be configured to simultaneously verify multiple pieces of authorization information. In general, the hash/encryption algorithm required for the authorization verification processing (also simply referred to as the authorization processing) requires a lot of calculations, and thus the time required is longer than that for other processes. Performance improvement of the information storage device 700 can be expected by executing the authorization processing for multiple pieces of authorization information in parallel. In the authorization information verification unit 111 capable of simultaneously verifying multiple pieces of authorization information, for example, the verification processing is performed on authorization information that has been extracted in order.

In order for the authorization result applying unit 712 to obtain a correspondence relationship between authorization information and a control command, the authorization information extraction unit 710 sends, to the authorization information verification unit 111, authorization information to which an appropriate identifier has been appended, and sends, to the authorization result applying unit 712, an I/O command to which an appropriate identifier has been appended. The authorization information verification unit 111 sequentially processes the authorization information and sends a combination of the identifier and information indicating permission or inhibition of execution to the authorization result applying unit 712.

When the authorization information extraction unit 710 notifies the authorization result applying unit 712 of the I/O command and the like, the I/O command and the like may be temporarily stored in the embedded volatile memory unit 114 together with the identifier (FIG. 8), and the authorization result applying unit 712 may refer to the information as appropriate (cache of the authorization result).

In the table of FIG. 8, a column 800 for storing an identifier and a column 801 for storing information indicating a target I/O command and a target logical area (or a target I/O command and a combination of a target logical area and a target object) are defined. An ID1 stored in the column 800 of a row 810 of this table is an identifier for specifying an I/O command stored in the column 801 of the row 810 (here, a READ command for a target object OBJ1 stored in a target logical area LS1). An ID2 stored in the column 800 of a row 811 of this table is an identifier for specifying an I/O command stored in the column 801 of the row 811 (here, a WRITE command for a target object OBJ2 stored in a target logical area LS2).

For example, when the authorization result (information indicating permission/inhibition of execution) and the corresponding identifier (corresponding to ID1, ID2, . . . in FIG. 8) are notified from the authorization information verification unit 111, the authorization result applying unit 712 reads the I/O command associated with the notified identifier from the embedded volatile memory unit 114, and applies the authorization result to the read I/O command. For example, when the authorization result and the ID1 of FIG. 8 are notified from the authorization information verification unit 111, the authorization result applying unit 712 reads the READ command for the target object OBJ1 in the logical area LS1 from the embedded volatile memory unit 114, and applies the authorization result to the READ command.

The authorization information verification unit 111 may store the authorization result (information indicating permission/inhibition of execution) and the identifier for identifying the I/O command corresponding to the authorization result in the embedded volatile memory unit 114 in a state where the authorization result and the identifier are associated with each other. In this case, for example, when applying the authorization result to the READ command associated with the ID1, the authorization result applying unit 712 reads the authorization result that is associated with the identifier matching the ID1 from the embedded volatile memory unit 114, and applies the read authorization result to the READ command associated with the ID1.

The authorization result applying unit 712 may include a small amount of memory capable of constituting a queue. When the authorization result and the identifier are notified from the authorization information verification unit 111, the authorization result applying unit 712 may achieve association between the authorization result and the I/O command in the authorization result applying unit 712 by acquiring the I/O command associated with the notified identifier from the queue.

In any case, the authorization result applying unit 712 executes the I/O command while maintaining the correspondence relationship between the result of the authorization information and the I/O command that is notified from the authorization information extraction unit 710.

Summary of Third Embodiment

In the manner as described above, when the authorization information verification unit 111 can process multiple pieces of authorization information simultaneously, the corresponding authorization result can be applied to each I/O command without depending on the verification completion order of the authorization information. As a result, in addition to the effects of the first embodiment, improvement of performance indexes such as I/O throughput and I/O latency of the information storage device 700 can be expected.

Here, the third embodiment has been described as a modification to the first embodiment, but the configuration of the information storage device 700 of the third embodiment that performs the authorization processing on multiple pieces of authorization information in parallel can be realized as a modification to the second embodiment.

Fourth Embodiment (Functional Block Diagram)

Next, a fourth embodiment will be described. In each of the embodiments described above, the authorization processing for verifying authorization information is performed in the preceding stage of the nonvolatile memory control unit. On the other hand, in the fourth embodiment, authorization processing for verifying authorization information and command processing for processing an I/O command can be performed in parallel.

Figure 9:
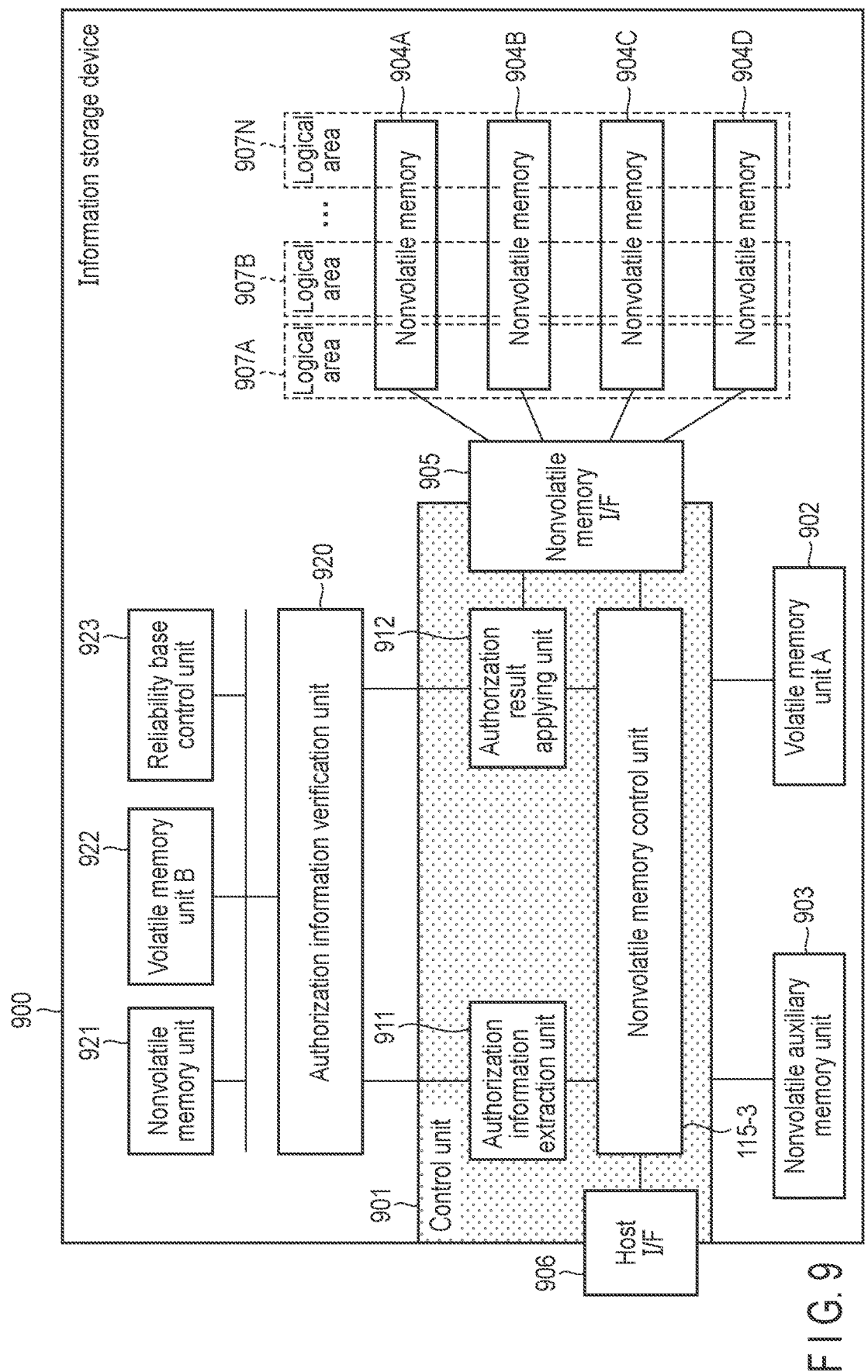
FIG. 9 is a block diagram illustrating an example of a configuration of an information storage device according to a fourth embodiment.

FIG. 9 is a block diagram illustrating an example of a configuration of an information storage device 900 according to the fourth embodiment.

The information storage device 900 according to the fourth embodiment includes a control unit 901, a volatile memory unit (A) 902, a nonvolatile auxiliary memory unit 903, nonvolatile memories 904A to 904D, an authorization information verification unit 920, a nonvolatile memory unit 921, a volatile memory unit (B) 922, and a reliability base control unit 923. The control unit 901 is connected to a host computer via a host I/F 906, and is connected to the nonvolatile memories 904A to 904D via a nonvolatile memory I/F 905. The nonvolatile memories 904A to 904D are configured as logical areas 907A to 907N.

The control unit 901 in the fourth embodiment is different from the control unit 101 in the first embodiment mainly in that the authorization information verification unit 920 is externally attached, and the nonvolatile memory control unit 115-3 is directly connected to the host I/F 906. The nonvolatile memory unit 921, the volatile memory unit (B) 922, and the reliability base control unit 923 that are used by the externally attached authorization information verification unit 920 are connected to the authorization information verification unit 920. The volatile memory unit (A) 902 and the nonvolatile auxiliary memory unit 903 that are used by the control unit 901 are connected to the control unit 901 as in the first embodiment. The volatile memory unit (A) 902 is used as a working memory or the like for the control unit 901 to operate, and the nonvolatile auxiliary memory unit 903 is used to store initialization parameters or the like for the control unit 901 to operate. This object is the same as that in the other embodiments.

The nonvolatile memory control unit 115-3 according to the fourth embodiment newly has a function of duplicating an I/O command that includes authorization information and is received via the host I/F 906 and notifying the authorization information extraction unit 911 of the duplicated I/O command together with an appropriate identifier. This function is substantially the same as the function of the authorization information extraction unit 710 in the third embodiment (the authorization information extraction unit 710 separates the authorization information and the I/O command, but the authorization information extraction unit 911 simply copies the I/O command including the authorization information without separating the authorization information and the I/O command). The nonvolatile memory control unit 115-3 has a function of generating a control command for controlling the nonvolatile memories 904A to 904D and the logical areas 907A to 907N on the basis of the I/O command, and notifying the authorization result applying unit 912 of the generated control command together with the same identifier as the identifier notified to the authorization information extraction unit 911.

The authorization information extraction unit 911 that has received the I/O command including the authorization information from the nonvolatile memory control unit 115-3 has a function of extracting the authorization information similarly to the authorization information extraction unit in the first embodiment and notifying the authorization information verification unit 920 of the authorization information together with the identifier and the identifier of the target logical area. The authorization information verification unit 920 has a function of verifying the authorization information in consideration of the correspondence with the logical area as in the first embodiment, and a function of storing the authorization result and the identifier in the volatile memory unit (B) 922 and notifying the authorization result applying unit 912 of the control unit 901 of the authorization result and the identifier.

The authorization result applying unit 912 has a function of controlling whether to notify the nonvolatile memories 904A to 904D (and the logical areas 907A to 907N configured thereof) of the control command via the nonvolatile memory I/F 905 on the basis of the authorization result and the identifier notified from the authorization information verification unit 920, and the control command and the identifier output from the nonvolatile memory control unit 115-3 and the identifier specifying the execution target logical area of the command. Here, when the nonvolatile memories 904A to 904D (and the logical areas 907A to 907N) are not notified of the control command (=execution of the control command is not permitted), the authorization result applying unit 912 also has a function of notifying the nonvolatile memory control unit 115-3 of the fact.

(Operation Sequence)

Figure 10A:
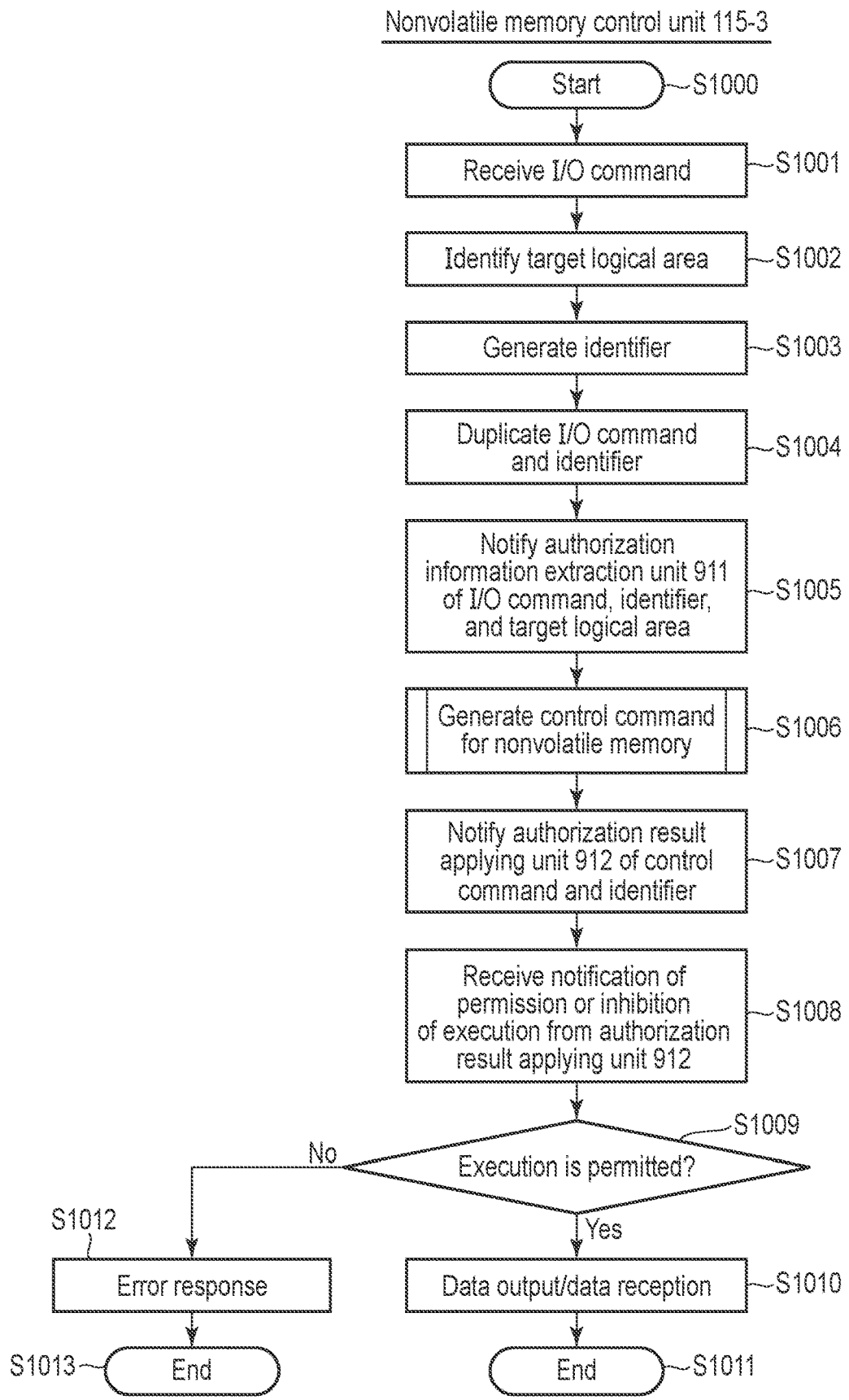
FIG. 10A is a flowchart illustrating a first operation sequence of the information storage device according to the fourth embodiment.
Figure 10B:
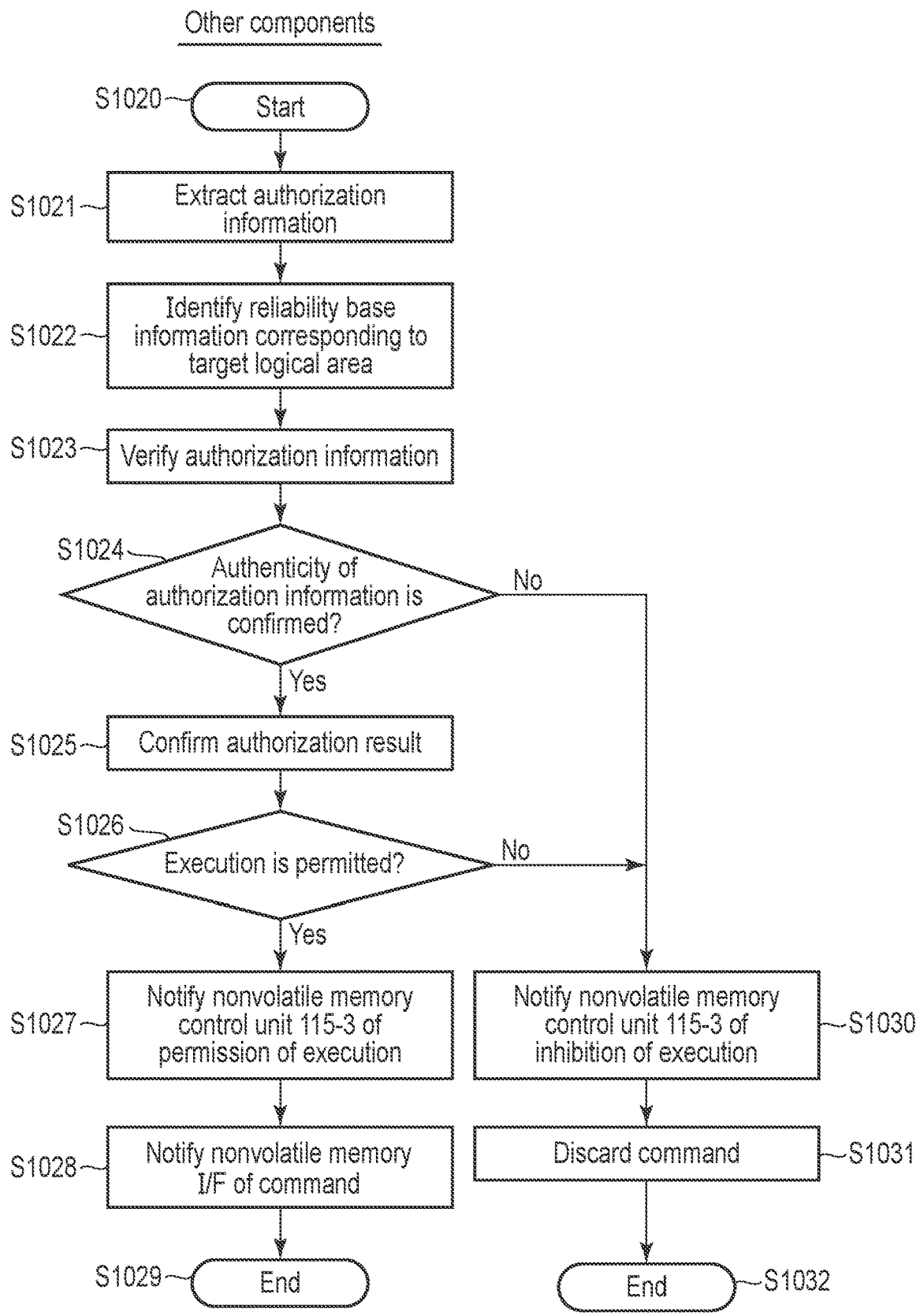
FIG. 10B is a flowchart illustrating a second operation sequence of the information storage device according to the fourth embodiment.

An operation sequence in the fourth embodiment is illustrated in FIGS. 10A and 10B. In order to clarify features of the fourth embodiment, processing performed by the nonvolatile memory control unit 115-3 is described in FIG. 10A (steps S1000 to S1013), and processing performed by other components (the authorization information extraction unit 911, the authorization information verification unit 920, and the authorization result applying unit 912) is described in FIG. 10B (steps S1020 to S1032).

The operation of the fourth embodiment starts when the nonvolatile memory control unit 115-3 receives an I/O command via the host I/F 906 (Steps S1000 and S1001). The nonvolatile memory control unit 115-3 identifies a logical area to be a target of the I/O command on the basis of the I/O command received in step S1001 (step S1002). Next, an identifier for identifying this I/O command is generated (step S1003), the I/O command and the identifier are duplicated (step S1004), and the duplicated I/O command and its target logical area and the identifier are sent to the authorization information extraction unit 911 (step S1005). From here, the nonvolatile memory control unit 115-3 and the other components perform different operations in parallel.

The nonvolatile memory control unit 115-3 performs processing necessary for executing the received I/O command. For example, processing of identifying a physical nonvolatile memory to be an actual access destination from a target logical area and generating a control command to be transmitted to the identified nonvolatile memory is performed (step S1006). The generated control command is notified to the authorization result applying unit 912 together with the identifier generated in step S1003 (step S1007). On the other hand, as illustrated in FIG. 10B, the other components perform a series of verification processes as described in the first to third embodiments on the authorization information included in the duplicated I/O command. The authorization result is notified to the authorization result applying unit 912 together with the identifier for identifying the corresponding I/O command (steps S1020 to S1025). In the series of processes in steps S1020 to S1025, the volatile memory unit (B) 922 and the reliability base control unit 923 are used similarly to the first to third embodiments.

When the execution of the I/O command is permitted (Yes in step S1026), the authorization result applying unit 912 notifies the nonvolatile memory control unit 115-3 that the execution of the control command notified from the nonvolatile memory control unit 115-3 is permitted (step S1027). Then, the authorization result applying unit 912 notifies a nonvolatile memory among the nonvolatile memories 904A to 904D of the control command that is notified from the nonvolatile memory control unit 115-3, via the nonvolatile memory I/F 905, and performs reading and writing of data and the like (step S1028). When the execution of the I/O command is not permitted (No in step S1026), the authorization result applying unit 912 notifies the nonvolatile memory control unit 115-3 that the execution of the control command notified from the nonvolatile memory control unit 115-3 is not permitted (S1030). Then, the authorization result applying unit 912 discards the control command notified from the nonvolatile memory control unit 115-3 so that the control command is not executed for the nonvolatile memories 904A to 904D (step S1031).

As illustrated in FIG. 10A, the nonvolatile memory control unit 115-3 receives the notification of the authorization result (permission or inhibition) from the authorization result applying unit 912. Then, when the execution is permitted (Yes in step S1009), the nonvolatile memory control unit 115-3 identifies data to be processed by using the identifier corresponding to the control command permitted to be executed, outputs the specified data to the nonvolatile memory of the access destination or receives the data from the nonvolatile memory of the access destination (step S1010), and ends the processing (step S1011). When the execution is not permitted (No in step S1009), the nonvolatile memory control unit 115-3 returns an error response to the host computer (step S1012), and ends the processing (step S1013). The above is the operation sequence of the fourth embodiment.

Summary of Fourth Embodiment

In the fourth embodiment, the processing such as the control command generation by the nonvolatile memory control unit 115-3 and the verification processing of the authorization information by the authorization information extraction unit 911, the authorization result applying unit 912, and the authorization information verification unit 920 can be performed in parallel on the basis of the I/O command received by the nonvolatile memory control unit 115-3 via the host I/F 906, thereby improving the performance of the information storage device 900 as compared with the first embodiment.

As described in the first embodiment, the authorization result applying unit 912 excludes control commands for internal operations such as garbage collection, wear leveling, and patrol read from application target commands of the authorization processing, and permits execution of these control commands for internal operations regardless of the authorization information.

Fifth Embodiment

A fifth embodiment is a modification of the fourth embodiment. Since the operation sequence of the fifth embodiment is substantially the same as (and obvious modifications of) the operation sequence of the fourth embodiment, only the configuration example of the fifth embodiment will be described here.

(Functional Block Diagram)

Figure 11:
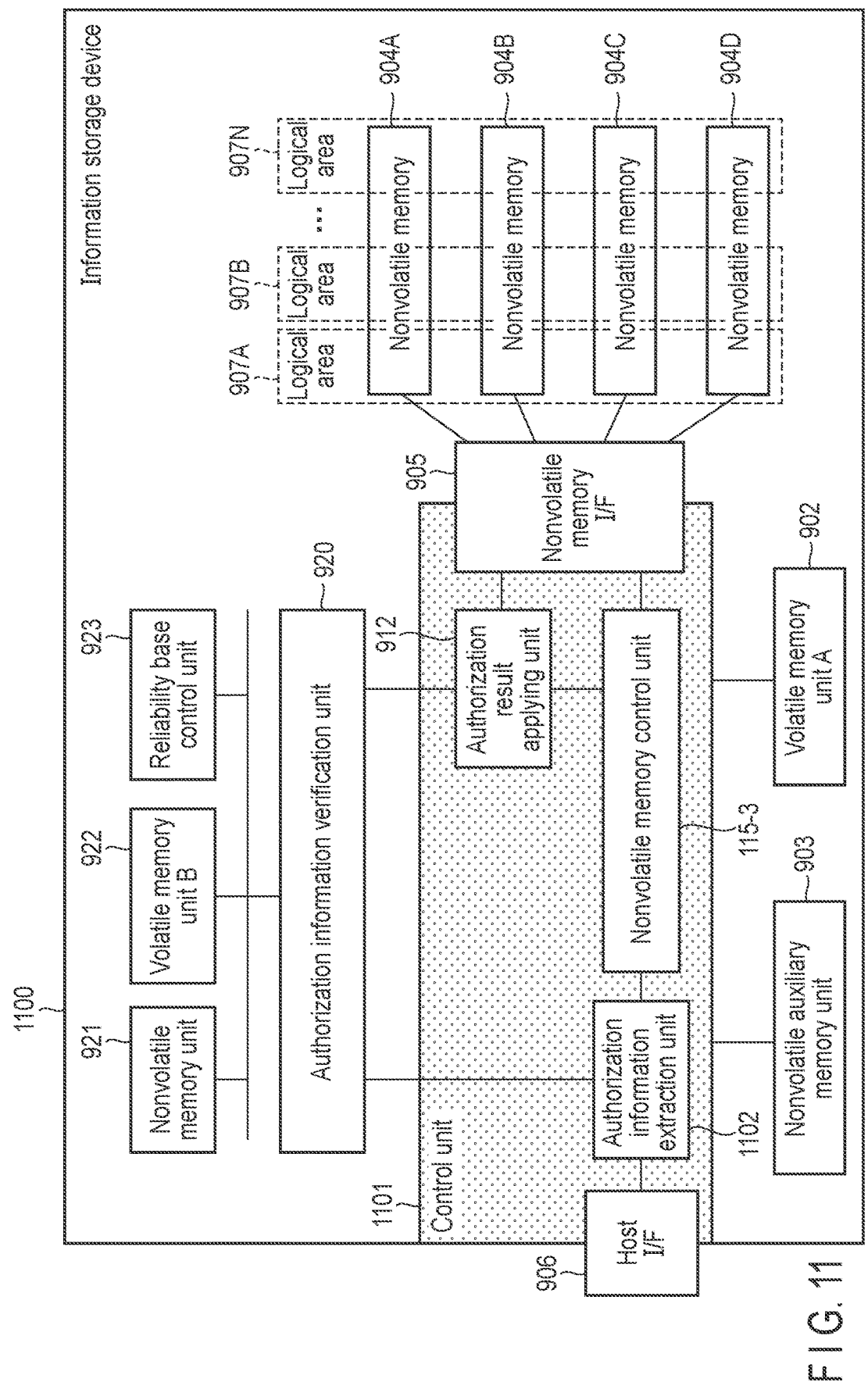
FIG. 11 is a block diagram illustrating an example of a configuration of an information storage device according to a fifth embodiment.

FIG. 11 is a block diagram illustrating an example of a configuration of an information storage device 1100 according to the fifth embodiment. In the information storage device 1100 according to the fifth embodiment, a control unit 1101 is different from the control unit 901 of the information storage device 900 according to the fourth embodiment. In particular, the internal configuration of the control unit 1101 is different, and an authorization information extraction unit 1102 is arranged between the host I/F 906 and the nonvolatile memory control unit 115-3 as in the first embodiment.

The authorization information extraction unit 1102 has a function of extracting authorization information from an I/O command received via the host I/F 906 after generating an identifier corresponding to the I/O command, a function of notifying the authorization information verification unit 920 of the generated identifier and the extracted authorization information, and a function of notifying the nonvolatile memory control unit 115-3 of the generated identifier and the I/O command.

Summary of Fifth Embodiment

With this configuration, an effect similar to that of the fourth embodiment can be obtained without significantly changing the existing nonvolatile memory control unit 115-3. That is, the processing such as command generation for accessing the nonvolatile memories 904A to 904D by the nonvolatile memory control unit 115-3 and the authorization processing by the authorization information extraction unit 1102, the authorization result applying unit 912, and the authorization information verification unit 920 can be performed in parallel.

Sixth Embodiment

In each of the embodiments described above, a functional element specialized for the authorization processing is added to the control unit. In a sixth embodiment, a general-purpose processing unit is added to the control unit, and processing of the authorization information and application of the authorization result are performed as one of the processing executed by the general-purpose processing unit. With this configuration, the information storage device 1200 according to the sixth embodiment can be achieved as an information storage device including a general-purpose processing unit such as computational storage devices, for example.

(Functional Block Diagram)

Figure 12:
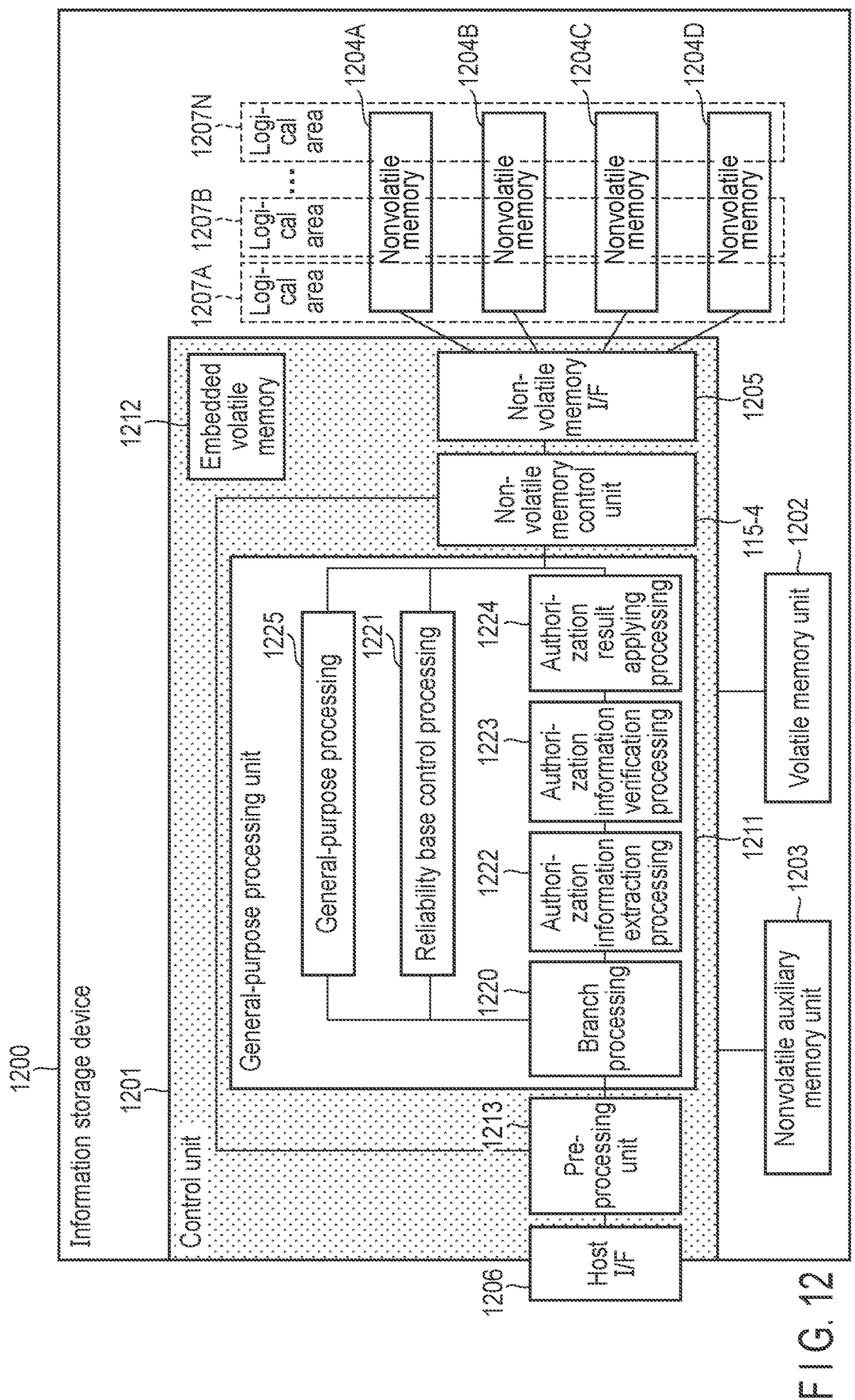
FIG. 12 is a block diagram illustrating an example of a configuration of an information storage device according to a sixth embodiment.

FIG. 12 is a block diagram illustrating an example of a configuration of an information storage device 1200 according to the sixth embodiment. A reference numeral is newly assigned to each element of the information storage device 1200. The information storage device 1200 includes a control unit 1201, a volatile memory unit 1202, a nonvolatile auxiliary memory unit 1203, nonvolatile memories 1204A to 1204D (and logical areas 1207A to 1207N), a nonvolatile memory interface (I/F) 1205, and a host interface (I/F) 1206. The function and role of each component other than the control unit 1201 are the same as those of the embodiments described above.

The control unit 1201 includes a nonvolatile memory control unit 115-4, a general-purpose processing unit 1211, an embedded volatile memory unit 1212, and a pre-processing unit 1213. The nonvolatile memory control unit 115-4 generates a control command for controlling the nonvolatile memories 1204A to 1204D (and the logical areas 1207A to 1207N) on the basis of an I/O command received from the outside, and performs processing of reading and writing information from and to the nonvolatile memories 1204A to 1204D, similarly to the embodiments described above. The embedded volatile memory unit 1212 is a memory that is used as a temporary memory unit by the nonvolatile memory control unit 115-4 and the processing and software operating in the general-purpose processing unit 1211. For example, the embedded volatile memory unit 1212 is used to store various types of information necessary for the authorization information processing of each embodiment described above.

The pre-processing unit 1213 performs processing for receiving an I/O command via the host I/F 1206, processing for determining whether the received I/O command is an I/O command that requires processing in the general-purpose processing unit 1211, processing for transferring the I/O command to the general-purpose processing unit 1211 when it is determined that processing in the general-purpose processing unit 1211 is required, and processing for transferring the I/O command to the nonvolatile memory control unit 115-4 when it is determined that processing in the general-purpose processing unit 1211 is not required.

The general-purpose processing unit 1211 is a processing unit on which at least one general-purpose processor core is mounted, and performs processing on data that is exchanged with the host computer by the nonvolatile memory control unit 115-4, by loading and executing software. The general-purpose processing unit 1211 may include a dedicated core or a reconfigurable hardware circuit (FPGA or the like) in addition to the general-purpose processor core. The reconfigurable hardware circuit functions as a hardware processing unit that can be dynamically reconfigured by reading configuration information.

After the control unit 1201 is initialized (for example, immediately after the control unit 1201 is initialized), the general-purpose processing unit 1211 acquires the software executed by the general-purpose processing unit 1211 or the configuration information of the hardware processing unit capable of being dynamically reconfigured via the host I/F 1206 and stores the software or the configuration information in the nonvolatile auxiliary memory unit 1203. The general-purpose processing unit 1211 reads the stored software from the nonvolatile auxiliary memory unit 1203 and executes the software, or reads the configuration information from the nonvolatile auxiliary memory unit 1203 and reconfigures the hardware processing unit.

FIG. 12 illustrates some processes implemented by the software of the general-purpose processing unit 1211 (or the reconfigurable hardware processing unit). Branch processing 1220 is processing that is at a start point of processing in the general-purpose processing unit 1211, and is processing of determining subsequent processing according to the I/O command or data, the state of the general-purpose processing unit 1211, the state of the nonvolatile memory control unit 115-4, and the like, thereby determining appropriate processing to be performed and invoking the determined processing. When the authorization information is appended to the I/O command, authorization information extraction processing 1222, authorization information verification processing 1223, and authorization result applying processing 1224 are performed. If the processing related to the reliability base necessary for the processing of the authorization information is necessary, reliability base control processing 1221 is performed. The reliability base control processing 1221 includes, for example, updating (refreshing) of the reliability base information provided by the authorization server. When general-purpose processing other than the processing of the authorization information is required, general-purpose processing 1225 is performed. The general-purpose processing 1225 includes, for example, processing necessary in advance for the nonvolatile memory control unit 115-4 to perform processing according to the I/O command. This general-purpose processing is not directly related to the present invention, and thus detailed description thereof will be omitted. Each piece of processing may be stored as a program in the nonvolatile auxiliary memory unit 1203, may be stored as a program in an area secured in the nonvolatile memories 1204A to 1204D (and the logical areas 1207A to 1207N), or may be notified from the host computer and temporarily stored as a program in the volatile memory unit 1202 or the embedded volatile memory unit 1212. In any case, each piece of processing is stored as a program loaded from a storage unit and executed by the general-purpose processing unit 1211. Alternatively, each piece of processing may be stored in the nonvolatile auxiliary memory unit 1203 as configuration information of the reconfigurable hardware circuit.

The nonvolatile memory control unit 115-4 has a function of receiving an I/O command and data processed by the general-purpose processing unit 1211 as necessary and writing the data in the logical areas 1207A to 1207N configured in the nonvolatile memories 1204A to 1204D, a function of receiving an I/O command and reading the data from 1207A to 1207N configured in the nonvolatile memories 1204A to 1204D and outputting the read data, a function of outputting the read data to the general-purpose processing unit 1211 so that the general-purpose processing unit 1211 can process the data, and a function of performing processing necessary for maintaining the nonvolatile memories 1204A to 1204D as memory units. Basically, the nonvolatile memory control unit 115-4 has the same function as that of the nonvolatile memory control unit in the first to fifth embodiments.

(Sequence Diagram and Flowchart)

The operation of the information storage device 1200 according to the sixth embodiment is the same as the operation of the information storage device 100 according to the first embodiment. Therefore, the detailed description here is omitted.

(Modification)

Figure 13:
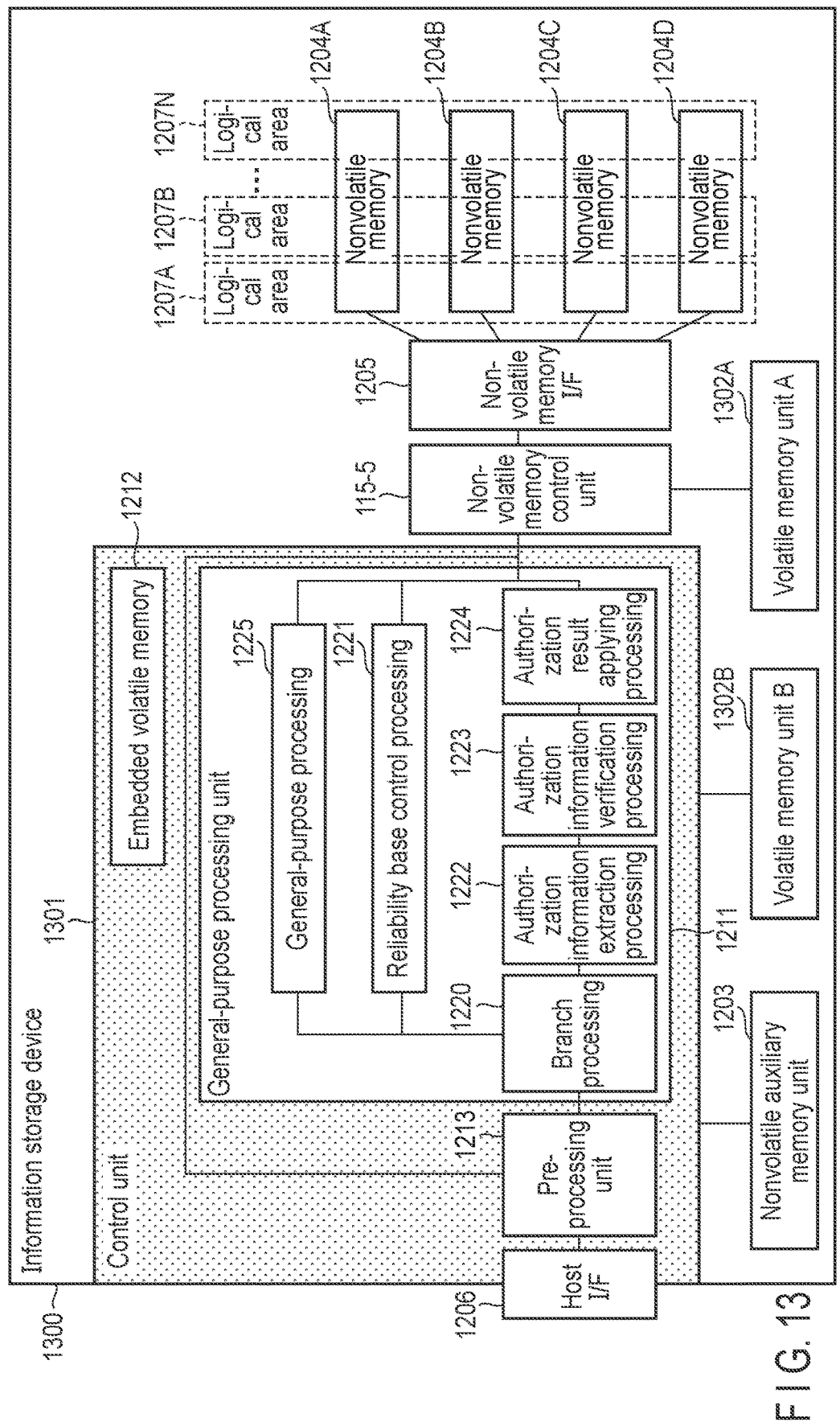
FIG. 13 is a block diagram illustrating another example of a configuration of the information storage device according to the sixth embodiment.

An information storage device 1300 in FIG. 13 is a modification of the information storage device 1200 of the sixth embodiment described with reference to FIG. 12, and a relationship of the information storage device 1300 in FIG. 13 with respect to the information storage device 1200 of the sixth embodiment is a relationship as in the second embodiment with respect to the first embodiment. In the information storage device 1300 of FIG. 13, the nonvolatile memory control unit 115-4 incorporated in the control unit 1201 in FIG. 12 is output to the outside of a control unit 1301 as a nonvolatile memory control unit 115-5, and the volatile memory unit 1202 of FIG. 12 is divided into a volatile memory unit (A) 1302A dedicated to the nonvolatile memory control unit 115-5 and a volatile memory unit (B) 1302B dedicated to the control unit 1301. With this configuration, it is easy to achieve both the existing processing of the nonvolatile memory control unit and the processing of the authorization information using the general-purpose processing unit.

Summary of Sixth Embodiment

The above is the description of the sixth embodiment. Since the processing of the authorization information is performed by the general-purpose processing unit 1211 which is a processing unit for general-purpose, the processing of the authorization information can be achieved by software similarly to other processing, and the processing of the authorization information can be easily introduced into the existing information storage device. As described as the modification of the sixth embodiment, the processing of the authorization information can be more easily introduced by separating the control unit 1301 that performs the general-purpose processing and the nonvolatile memory control unit 115-5.

Seventh Embodiment

A seventh embodiment is a modification of the sixth embodiment, and the relationship of the seventh embodiment with respect to the sixth embodiment is as the relationship of the fourth embodiment with respect to the first embodiment. That is, a control unit that performs general-purpose processing and a nonvolatile memory control unit are arranged in parallel, thereby performing parallel processing. Therefore, the performance of the information storage device can be expected to be improved.

(Functional Block Diagram)

Figure 14:
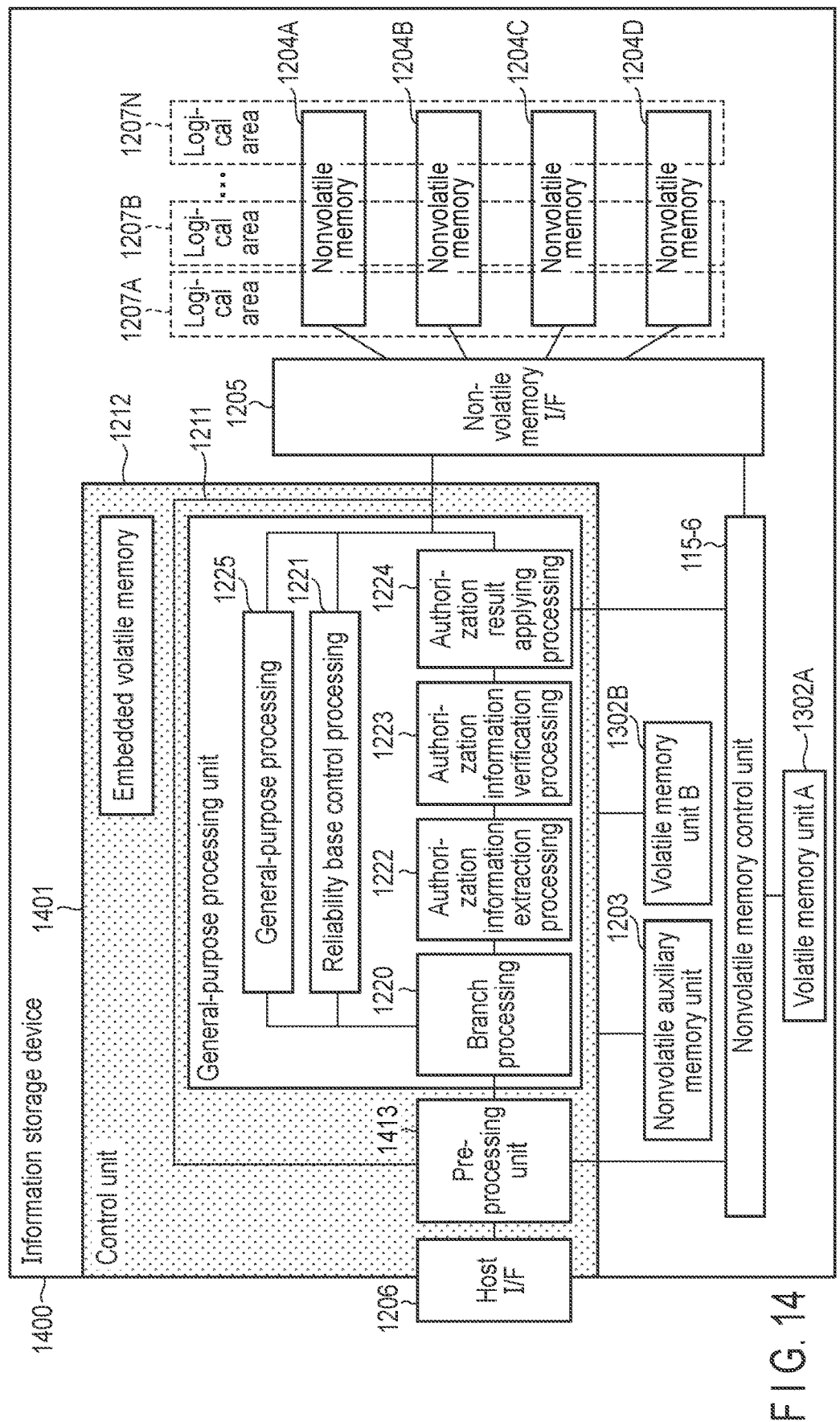
FIG. 14 is a block diagram illustrating an example of a configuration of an information storage device according to a seventh embodiment.

FIG. 14 is a block diagram illustrating an example of a configuration of an information storage device 1400 according to the seventh embodiment. The information storage device 1400 includes a control unit 1401, a nonvolatile memory control unit 115-6, and a memory unit (a nonvolatile auxiliary memory unit 1203, a volatile memory unit (A) 1302A, a volatile memory unit (B) 1302B) and interfaces (a host interface (I/F) 1206, a nonvolatile memory interface (I/F) 1205) that are connected to the control unit 1401 and the nonvolatile memory control unit 115-6.

As similar to the authorization information extraction unit 911 in the fourth embodiment, a pre-processing unit 1413 included in the control unit 1401 generates an identifier from the I/O command, notifies the general-purpose processing unit 1111 of the identifier and the authorization information, and notifies the nonvolatile memory control unit 115-6 of the identifier and the I/O command.

In order to apply the authorization result to a control command for nonvolatile memories 1204A to 1204D (for accessing logical areas 1207A to 1207N) that is generated by the nonvolatile memory control unit 115-6, the identifier and the control command are notified from the nonvolatile memory control unit 115-6 to authorization result applying processing 1224 of a general-purpose processing unit 1211. Correspondingly, the authorization result applying processing 1224 notifies the nonvolatile memory control unit 115-6 of permission or inhibition of execution of the control command. As a result of the authorization, when the execution of the control command is permitted, the authorization result applying processing 1224 notifies the nonvolatile memories 1204A to 1204D configuring the logical areas 1207A to 1207N of the control command notified from the nonvolatile memory control unit 115-6 via the nonvolatile memory I/F 1205. When the execution of the control command is not permitted, the notified control command is discarded. On the other hand, when the permission is notified from the authorization result applying processing 1224, the nonvolatile memory control unit 115-6 performs processing of accepting reading and writing of corresponding data, and when the inhibition is notified, discards the data. The series of processes is the same as the processes in the fourth embodiment.

(Sequence Diagram and Flowchart)

As described above, the components of the seventh embodiment are different from those of the fourth embodiment, but the operation of the seventh embodiment is the same as that of the fourth embodiment, and thus the detailed description thereof will be omitted.

Summary of Seventh Embodiment

The above is the description of the seventh embodiment. By connecting the general-purpose processing unit 1211 and the nonvolatile memory control unit 115-6 in parallel, processing of both components can be performed simultaneously, and improvement in processing performance of the information storage device 1400 can be expected.

Eighth Embodiment

Next, an eighth embodiment will be described. In each of the embodiments described above, an implementation method of adding a function of processing authorization information to the information storage device has been described. In the eighth embodiment, an information storage device is connected to a communication network via a communication interface, and a function of processing authorization information is added to a communication interface located at a preceding stage of the information storage device, so that the authorization information can be processed.

(Functional Block Diagram)

FIG. 15 is a block diagram illustrating an example of a configuration of a communication interface 1500 according to the eighth embodiment. In the eighth embodiment, the function of processing the authorization information is not implemented in a control unit in the information storage device but implemented in the communication interface 1500. That is, in the eighth embodiment, the communication interface 1500 functions as an I/O command control device configured to permit or inhibit execution of an I/O command (or control command) by processing the authorization information.

The communication interface 1500 is implemented as, for example, a network interface card (or network interface controller) (NIC). The information storage device is connected to a communication network via the communication interface 1500.

The communication interface 1500 includes, as main components thereof, a network interface (I/F) 1501 connected to the communication network, a host interface (I/F) 1502 connected to an information storage device via a host computer, a layer 2 (L2) processing unit 1503 that performs processing of a data link layer, particularly a MAC layer, in a communication protocol stack, a communication protocol processing unit 1504 higher than the data link layer, a storage protocol processing unit 1505 that performs processing of a storage protocol transmitted and received via a communication protocol, a reliability base control unit 1506 that performs acquisition, maintenance, and management of reliability base information used for verification of authorization information, an authorization information processing unit 1507 that processes authorization information, a nonvolatile auxiliary memory unit 1508 that stores initial setting of each functional element and a control program on the communication interface 1500, and a volatile memory unit 1509 that can be used as a temporary storage location of each functional element and a control program on the communication interface 1500, and a temporary storage location for packets to be transmitted and received.

The host I/F 1502 is a local bus interface for connection to a local bus such as PCIe. The host I/F 1502 functions as a control command interface.

An information storage device (storage device) such as an HDD or an SSD may be directly connected to the host I/F 1502. For example, when the host I/F 1502 has a function of PCIe root complex, the host I/F 1502 can be directly connected to the information storage device via a local bus such as PCIe. Hereinafter, although not limited, it is assumed that an information storage device (storage device) such as an HDD or an SSD is connected to the host I/F 1502 via a CPU of the host computer (host CPU), and an I/O command for reading from and writing to the information storage device is received from an external control entity such as a terminal device through the communication network. The information storage device includes one or more nonvolatile memories as in other embodiments (for example, nonvolatile memories 104A to 104D similar to those of the first embodiment). The communication interface 1500 and the host CPU have a function of dividing a physical storage area configured by the one or more nonvolatile memories into one or more logical areas (for example, logical areas 107A to 107N similar to those of the first embodiment) and using the logical areas.

The network I/F 1501 receives a packet addressed to the host computer to which the communication interface 1500 is connected, and transmits a packet addressed to another communication partner from the host computer. The network I/F 1501 corresponds to, for example, an interface such as 10 Gigabit Ethernet. The network I/F 1501 receives a datagram of a storage protocol including an I/O command by using a communication protocol.

The L2 processing unit 1503 performs the processing of the MAC layer as described above. The L2 processing unit 1503 solves a destination MAC address of a data link layer with respect to a transmission packet generated by the communication protocol processing unit 1504, generates and appends a data link header, and then transmits the datagram to the network at an appropriate timing. The L2 processing unit 1503 receives a datagram having a MAC address of the L2 processing unit 1503 as a destination MAC address, processes a data link header, then extracts a received packet from the received datagram, and sends the received packet to the communication protocol processing unit 1504.

When transmitting data to the communication network, the communication protocol processing unit 1504 applies processing of a transport protocol such as TCP or UDP (that may include a communication protocol such as QUIC or an encryption protocol such as TLS configured on the transport protocol) on the data received via the host I/F 1502, further performs protocol processing of IPv4 or IPv6 on the data, and then sends the data to the L2 processing unit 1503.

When receiving data from the communication network, the communication protocol processing unit 1504 receives an IPv4 datagram or an IPv6 datagram from the L2 processing unit 1503, performs processing of the Internet protocol and processing of the transport protocol, and then outputs data via the host I/F 1502.

The series of protocol processes includes, for example, congestion control and retransmission control of TCP, management of a transmission window, calculation of a checksum, division of large transmission data into portions with an appropriate segment size, integration of a reception segment into data with an appropriate size, and the like. Path management, multicast address management, and the like may be included as processing of the Internet protocol, and a mechanism capable of controlling settings of them via the host I/F 1502 may be included.

The storage protocol processing unit 1505 performs further processing on a packet of a storage protocol (I/O command) included in the packet received and processed by the communication protocol processing unit 1504, extracts a storage command, and notifies the host computer of the storage command via the host I/F 1502. The storage protocol processing unit 1505 performs storage protocol processing on a storage command received via the host I/F 1502 so that the storage command can be sent to the communication protocol processing unit 1504. As the storage protocol, NVMe over Fabric, NVMe over TCP, iSCSI, and the like are targeted. More specifically, for example, the storage protocol processing unit 1505 converts the I/O command into a control command that can be transmitted and received via the host I/F 1502 and is based on a logical area which is an execution target of the I/O command, by performing processing of the storage protocol.

As described in other embodiments, the reliability base control unit 1506 maintains and manages the reliability base information used for verifying the authenticity of the authorization information for each logical area. However, in the eighth embodiment, the communication protocol processing unit 1504 and the L2 processing unit 1503 included in the communication interface 1500 can communicate with the outside via the network I/F 1501. With this configuration, necessary reliability information is acquired or updated. Specifically, a secure communication path using TLS is established between the authorization server as a generation source of the authorization information and the communication interface 1500, and a digital certificate or the like indicating a base of the authorization server is acquired.

The function of the authorization information processing unit 1507 is the same as that of the previous embodiments. However, it is different in that the authorization information extraction unit 1510 identifies a logical area (target logical area) that is an execution target of an I/O command by using data in a packet processed by the communication protocol processing unit 1504 or the storage protocol processing unit 1505, and extracts authorization information from the data in the packet. Specifically, the authorization information extraction unit 1510 identifies a logical area which is an execution target of the I/O command by using, for example, a namespace ID designated in the I/O command included in the packet. For example, the authorization information processing unit 1507 extracts authorization information that is protected from modification by a sender of the I/O command, from data of the communication protocol received using any one of a method of storing the authorization information in a header portion or a data portion of the communication protocol processed by the communication protocol processing unit 1504, a method of using a packet of a communication protocol different from a packet including the I/O command, and a method of using a logical communication path of a communication protocol different from the logical communication path for the I/O command and having a correspondence relationship with the target logical area. In the method using the logical communication path of the communication protocol having the correspondence relationship with the target logical area, for example, one logical communication path may be set for one logical area, or a plurality of logical communication paths may be set for a plurality of logical areas.

(Supplementary Matters of Functional Block Diagram)

In the block diagram of FIG. 15, a case where the authorization information processing unit 1507 is configured as an independent component is illustrated, but the authorization information processing unit 1507 may be mounted inside the storage protocol processing unit 1505 which is closely related. Even if the authorization information processing unit 1507 is mounted inside the storage protocol processing unit 1505, the operation sequence does not change.

In the block diagram of FIG. 15, data to be sent to the host computer via the host I/F 1502 is data of a storage protocol. On the other hand, the host I/F 1502 may be a second network I/F, and the storage protocol may be configured as data of the storage protocol accompanied with a header of the second communication protocol or as data of the storage protocol having a different destination in the first communication protocol corresponding to the first network I/F 1501.

(Sequence Diagram and Flowchart)

Figure 16:
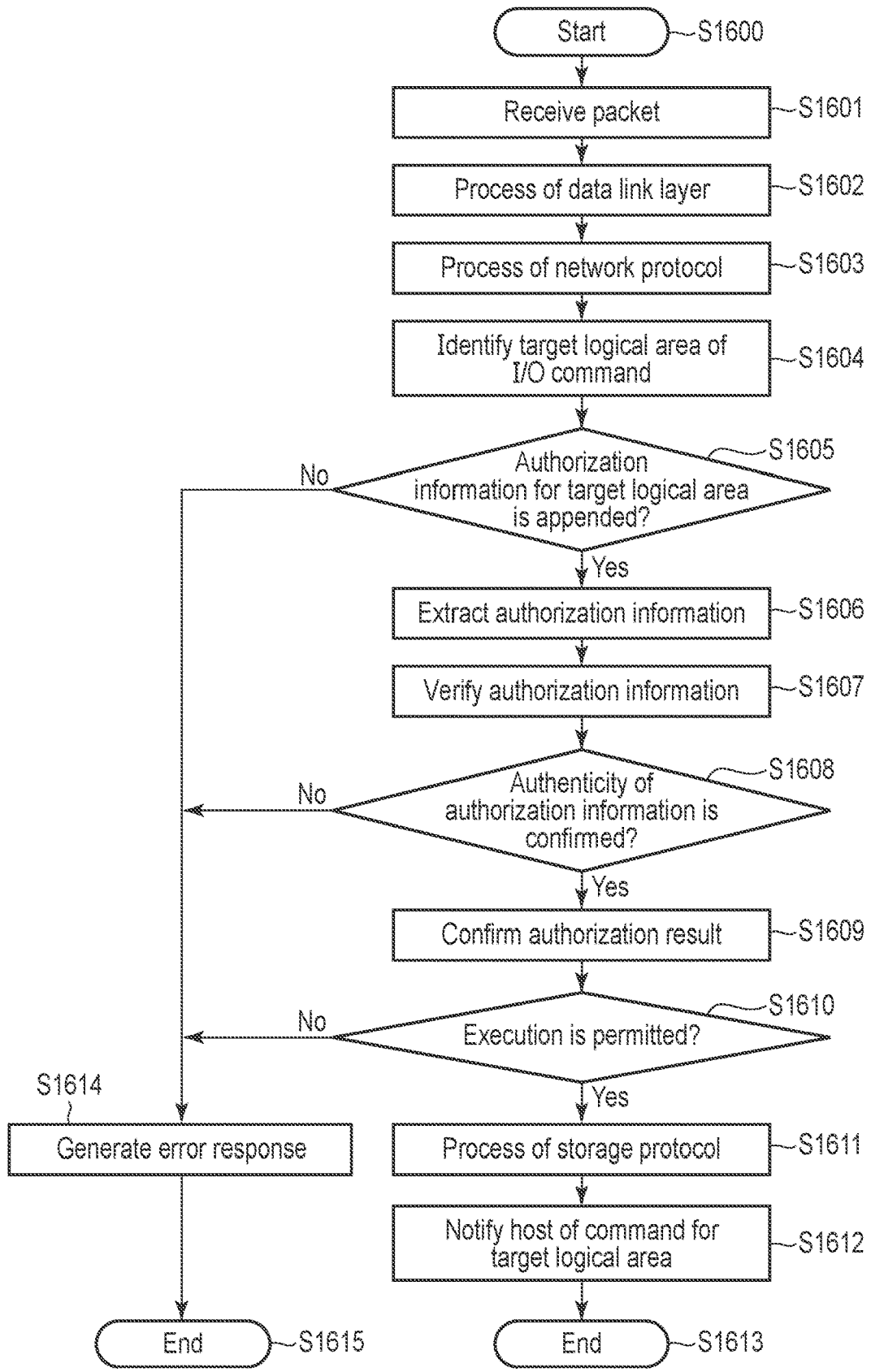
FIG. 16 is a flowchart illustrating an operation sequence of the communication interface according to the eighth embodiment.

FIG. 16 is a flowchart illustrating an operation sequence according to the eighth embodiment. In FIG. 16, only the operation when a packet is received is described. This is because the processing of authorization information is not performed when a packet is transmitted. The processing illustrated in this flowchart is started when the network I/F 1501 receives a packet (step S1600).

The processing from the packet reception processing (step S1601) to the processing of the network protocol (step S1603) is as described above in the description of the block diagram of FIG. 15. When the processing of the network protocol is completed, data of the storage protocol can be referred to.

When the data of the storage protocol can be referred to, an I/O command included in the data of the storage protocol can be referred to. Therefore, the authorization information extraction unit 1510 of the authorization information processing unit 1507 identifies a logical area that is an execution target of the I/O command (step S1604).

When the data of the storage protocol can be referred to, authorization information included in the data of the storage protocol (or a portion located between the header of the network protocol and the header of the storage protocol) can be referred to. Therefore, the authorization information extraction unit 1510 checks the presence or absence of the authorization information (step S1605).

When there is no authorization information (No in step S1605), the authorization information extraction unit 1510 determines that the data of the storage protocol is invalid. In this case, the storage protocol processing unit 1505 generates an error response in the storage protocol (step S1614), and the communication protocol processing unit 1504 and the L2 processing unit 1503 return the error response to the control entity through the network I/F 1501 by performing transmission processing of transmitting the error response, and the processing is thereby terminated.

On the other hand, when the authorization information is included (Yes in step S1605), the authorization information extraction unit 1510 extracts the authorization information (step S1606), and the authorization information verification unit 1511 verifies the authenticity of the extracted authorization information for the identified target logical area (steps S1607 and S1608). Since the specific content of the verification processing for verifying the authenticity of the authorization information is similar to the processing in each embodiment described above, the description thereof will be omitted.

When the authenticity of the authorization information is not confirmed (No in step S1608), an error is returned to the control entity in a similar manner to the processing in a case where there is no authorization information (flow starting from No in step S1605), and the processing is thereby terminated.

When the authenticity of the authorization information is confirmed (Yes in step S1608), the authorization result applying unit 1512 checks the content of the authorization information (authorization result) (steps S1609 and S1610).

When the execution of the I/O command (storage command) is not permitted by the authorization information (No in step S1610), the authorization result applying unit 1512 instructs the storage protocol processing unit 1505 to discard the data of the storage protocol corresponding to the authorization information and generate an error response (step S1614).

When the execution of the I/O command (storage command) is permitted by the authorization information (Yes in step S1610), the authorization result applying unit 1512 instructs the storage protocol processing unit 1505 to appropriately process the data of the storage protocol corresponding to the authorization information. The storage protocol processing unit 1505 that has received the instruction performs appropriate processing (step S1611) and notifies the host computer of the I/O command (storage command) for the target logical area via the host I/F 1502 (step S1612). As a result, the series of processes ends (step S1613). The above is the basic operation sequence in the eighth embodiment.

Although it has been described that all the processes are continuously performed in the series of operation sequences, this is not necessary. For example, the processing of the storage protocol may be performed in parallel with the authorization processing, and the authorization result may be applied at a stage of notifying the host computer. Such an implementation method is already described in other embodiments. That is, it is sufficient that, after generating an identifier corresponding to the received data, the storage protocol processing unit 1505 and the authorization information processing unit 1507 proceed with the processing while maintaining the correspondence relationship between the storage command and the authorization information, and the storage protocol processing unit 1505 waits for the notification from the authorization result applying unit 1512, and notifies the storage command corresponding to the identifier included in the notification to the host computer or discards the storage command.

Summary of Eighth Embodiment

The eighth embodiment has been described above. By performing the verification of the authorization information and the applying processing of the authorization result on the basis of the logical area that is the execution target of the I/O command on the communication interface 1500 that transmits and receives the storage protocol, high security can be achieved also for the storage device that reads and writes information based on the I/O command (storage command) received via the communication network.

Ninth Embodiment

A ninth embodiment is a modification of the eighth embodiment. In the eighth embodiment, the authorization processing is achieved by a dedicated component. In the ninth embodiment, a communication interface including a general-purpose processing unit is used, and the authorization processing is achieved by software executed by the general-purpose processing unit or a dedicated circuit that is dynamically reconfigurable.

(Functional Block Diagram)

Figure 17:
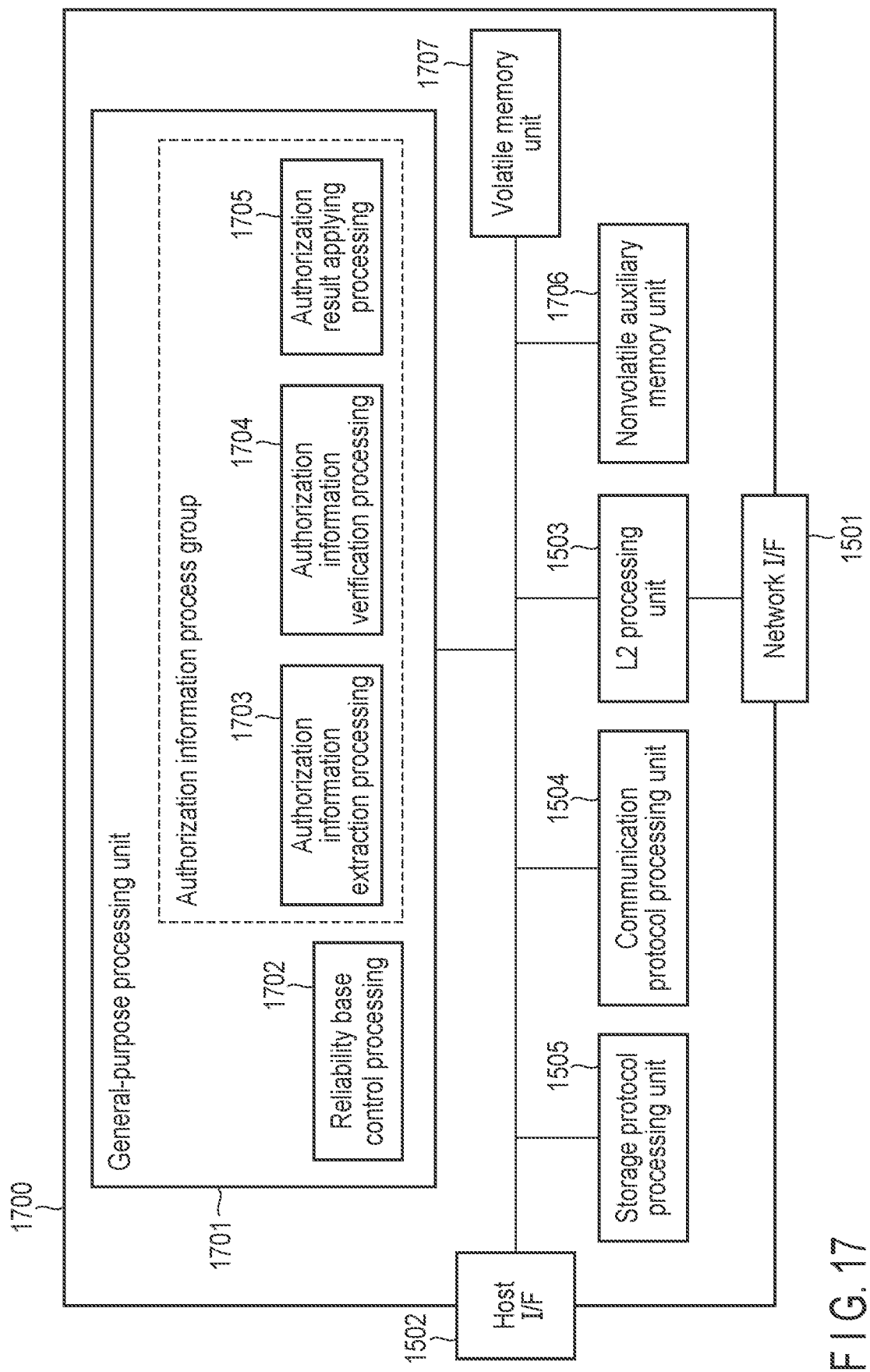
FIG. 17 is a block diagram illustrating an example of a configuration of a communication interface according to a ninth embodiment.

FIG. 17 is a block diagram illustrating an example of a configuration of a communication interface 1700 according to the ninth embodiment. Components equivalent to those of the eighth embodiment are denoted by the same reference numerals. The communication interface 1700 includes the components of the eighth embodiment excluding the authorization information processing unit 1507 and the reliability base control unit 1506, and includes a general-purpose processing unit 1701. A nonvolatile auxiliary memory unit 1706 stores software executed by the general-purpose processing unit 1701 and configuration information of dynamically reconfigurable hardware, in addition to information necessary for initialization of each component of the communication interface 1700. A volatile memory unit 1707 is used as a temporary memory area required by the components of the communication interface 1700 including the general-purpose processing unit 1701 at the time of execution.

The general-purpose processing unit 1701 includes a CPU core that can be used generically by executing software and an FPGA whose configuration can be dynamically changed on the basis of circuit information configured in advance. Although not illustrated, the general-purpose processing unit 1701 may include a small-scale volatile memory unit. Software executed by the CPU core or the FPGA can use the volatile memory unit as a temporary memory unit. Reliability base control processing 1702 and authorization information processing group (authorization information extraction processing 1703, authorization information verification processing 1704, and authorization result applying processing 1705) described in the general-purpose processing unit 1701 are software that performs the processing of the reliability base control unit 1506 and the authorization information processing unit 1507 (authorization information extraction unit 1510, authorization information verification unit 1511, and authorization result applying unit 1512) described in the eighth embodiment, respectively.

(Supplementary Matters of Functional Block Diagram)

In FIG. 17, the reliability base control processing 1702, the authorization information extraction processing 1703, the authorization information verification processing 1704, and the authorization result applying processing 1705 are described as functions achieved by the general-purpose processing unit 1701, but other components may be achieved in the general-purpose processing unit 1701 as software or a dynamically configurable circuit. That is, some of the L2 processing unit 1503, the communication protocol processing unit 1504, and the storage protocol processing unit 1505 may be implemented in the general-purpose processing unit 1701.

(Sequence Diagram and Flowchart)

The operation of the communication interface 1700 according to the ninth embodiment is the same as that of the eighth embodiment. Therefore, a sequence diagram and a flowchart are omitted.

Summary of Ninth Embodiment

The ninth embodiment has been described above. By performing the verification and applying processing of authorization information based on a logical area that is an execution target of an I/O command by the software operating in the general-purpose processing unit 1701 or the dynamically reconfigurable hardware, it can be achieved more easily than the eighth embodiment.

As described above, according to the information storage devices of the first to ninth embodiments, the authorization information reception unit receives, via the I/O command interface, authorization information that indicates whether to permit execution of an I/O command, the authorization information being protected from modification by a sender of the I/O command. The authorization information verification unit verifies, for each logical area, whether the received authorization information is not modified and is issued from a known authorization server, and when the received authorization information is not modified and is issued from a known authorization server, verifies whether the received authorization information permits execution of the I/O command. The authorization applying unit permits or inhibits the execution of the I/O command or a control command generated from the I/O command with respect to a logical area that is an execution target of the I/O command, in accordance with an authorization result indicating whether the received authorization information permits the execution of the I/O command. The reliability base control unit acquires reliability base information used by the authorization information verification unit to verify whether the received authorization information is not modified and is issued from a known authorization server, and maintains and manages the acquired reliability base information. The storage control unit generates the control command based on the I/O command. Therefore, even when an unauthorized program intrudes into software executed in the host computer, the terminal device, or the storage server, unauthorized access to the storage device can be prevented.

It is not necessary to append authorization information to all I/O commands to be received by the information storage device or the communication interface. For example, when a file system is constructed on the information storage device, reading and writing of meta information and journaling information of the file system may be excluded from an authorization target, and an operation of acquiring a list of files included in a directory (read operation for the directory) may be excluded from the authorization target. As similar to this, it may be implemented to request the authorization information only for reading and writing information itself.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An I/O command control device configured to connect to a storage device that divides a physical area into one or more logical areas and performs reading and writing of information based on an I/O command for each of the one or more logical areas, the physical area storing information to be read and information that is written, the I/O command control device comprising:

I/O command interface circuitry configured to receive the I/O command from an external control entity;

control command interface circuitry configured to transmit a control command for controlling the storage device to the storage device, the control command being generated based on the I/O command;

a controller circuitry configured to:
 receive the I/O command to which authorization information is appended, for each logical area that is an execution target of the I/O command via the I/O command interface circuitry, and extract the authorization information from the received I/O command, the authorization information indicating whether execution of the I/O command is permitted and being protected from modification performed by a sender of the I/O command;
 verify, for each of the logical areas, whether the extracted authorization information is not modified and is issued from a known authorization server, and when the extracted authorization information is not modified and is issued from the known authorization server, verifies verify whether the received extracted authorization information permits execution of the I/O command;
 permit or inhibit execution of the received I/O command or the control command generated from the received I/O command with respect to a logical area that is an execution target of the I/O command, in accordance with an authorization result indicating whether the received extracted authorization information permits execution of the I/O command;
 acquire reliability base information that is used by the controller to verify whether the extracted authorization information is not modified and is issued from the known authorization server, and maintain and manage the acquired reliability base information; and
 generate the control command based on the I/O command; and
 storage circuitry configured to temporarily store data,
 wherein the authorization information includes first identification information capable of identifying the I/O command that corresponds to the authorization information,
 the controller circuitry is configured to:
  extract the first identification information from the authorization information;
  store the authorization result and the extracted first identification information in the storage circuitry in a state where the authorization result and the extracted first identification information are associated with each other;
  generate second identification information capable of identifying the I/O command in accordance with the I/O command;
  store the I/O command, a first logical area that is an execution target of the I/O command among the one or more logical areas, and the second identification information in the storage circuitry in a state where the I/O command, the first logical area, and the second identification information are associated with each other;
  determine whether the first identification information matching the second identification information is stored in the storage circuitry;
  when the first identification information matching the second identification information is stored in the storage circuitry and the authorization result associated with the first identification information permits execution of the I/O command, permit execution of the I/O command or the control command generated from the I/O command in the first logical area; and
  when the first identification information matching the second identification information is not stored in the storage circuitry, or when the first identification information matching the second identification information is stored in the storage circuitry and the authorization result associated with the first identification information does not permit execution of the I/O command, inhibit execution of the I/O command or the control command generated from the I/O command in the first logical area.

2. The I/O command control device according to claim 1, wherein, when verifying the extracted authorization information, the controller circuitry is configured to verify, for each of the logical areas, whether the extracted authorization information is issued from the known authorization server that is set for the logical area that is a target of reading and writing, and
 the controller circuitry is configured to acquire the reliability base information for each of the logical areas, and maintain and manage the acquired reliability base information.

3. The I/O command control device according to claim 1, wherein
 when the controller circuitry receives first authorization information corresponding to a first I/O command for a second logical area among the one or more logical areas and does not receive second authorization information corresponding to a second I/O command for the second logical area, the second I/O command being related to the first I/O command, the controller circuitry is configured to permit or inhibit execution of the second I/O command for the second logical area in accordance with an authorization result of the first authorization information stored in the storage circuitry.

4. The I/O command control device according to claim 1, further comprising
 a nonvolatile auxiliary memory configured to store the reliability base information,
 wherein the controller circuitry is configured to:
 acquire at least one of a digital certificate and a common key as the reliability base information via the I/O command interface circuitry during initialization of the I/O command control device or during operation of the I/O command control device, the digital certificate including a public key corresponding to each of the one or more logical areas; and
 newly store the acquired reliability base information in the nonvolatile auxiliary memory for each of the logical areas, or update reliability base information already stored for a corresponding logical area in the nonvolatile auxiliary memory with the acquired reliability base information.

5. The I/O command control device according to claim 1, wherein
 the controller circuitry includes a general-purpose processing unit comprising at least one of a processor capable of executing software and a hardware processing unit capable of being dynamically reconfigured by reading configuration information,
 the I/O command control device further comprises a nonvolatile auxiliary memory configured to store the software executed by the general-purpose processing unit or the configuration information of the hardware processing unit capable of being dynamically reconfigured, and
 at least part of function of the controller circuitry is implemented by the software executed by the general-purpose processing unit or the hardware processing unit capable of being dynamically reconfigured.

6. The I/O command control device according to claim 5, wherein the general-purpose processing unit is configured to:
acquire the software executed by the general-purpose processing unit or the configuration information of the hardware processing unit capable of being dynamically reconfigured via the I/O command interface circuitry after the I/O command control device is initialized, and store the software and the configuration information in the nonvolatile auxiliary memory, and
read the stored software from the nonvolatile auxiliary memory and execute the software, or reads read the configuration information from the nonvolatile auxiliary memory and reconfigures reconfigure the hardware processing unit.

7. An information storage device comprising:
a nonvolatile memory; and
the I/O command control device according to claim 2,
wherein the I/O command interface circuitry is local bus interface circuitry that receives configured to receive the I/O command and transmit and receive data in a protocol of a local bus,
the control command interface circuitry is interface circuitry for transmitting a command for controlling the nonvolatile memory to the nonvolatile memory and transmitting and receiving data between the controller and the nonvolatile memory, and
the controller is configured to generate the command for controlling one of the one or more logical areas that are configured on the nonvolatile memory as the control command in accordance with the I/O command.

8. The information storage device according to claim 7, wherein
the controller circuitry includes a general-purpose processing unit including at least one of a processor capable of executing software or a hardware processing unit capable of being dynamically reconfigured by reading configuration information,
the I/O command control device further comprises a nonvolatile auxiliary memory configured to store the software executed by the general-purpose processing unit or the configuration information of the hardware processing unit capable of being dynamically reconfigured, and
wherein at least part of function of the controller is implemented by the software executed by the general-purpose processing unit or the hardware processing unit capable of being dynamically reconfigured.

9. The information storage device according to claim 7, wherein the controller circuitry is configured to permit execution of a control command that is used for an internal operation for maintenance and management of the nonvolatile memory regardless of the authorization information, and
the maintenance and the management of the nonvolatile memory includes creation and deletion of each of the one or more logical areas.

10. An I/O command control device configured to connect to a storage device that divides a physical area into one or more logical areas and performs reading and writing of information based on an I/O command for each of the one or more logical areas, the physical area storing information to be read and information that is written,
the I/O command control device comprising:
I/O command interface circuitry configured to receive the I/O command from an external control entity;
control command interface circuitry configured to transmit a control command for controlling the storage device to the storage device, the control command being generated based on the I/O command;
a controller circuitry configured to:
receive the I/O command to which authorization information is appended, for each logical area that is an execution target of the I/O command via the I/O command interface circuitry, and extract the authorization information from the received I/O command, the authorization information indicating whether execution of the I/O command is permitted and being protected from modification performed by a sender of the I/O command;
verify, for each of the logical areas, whether the extracted authorization information is not modified and is issued from a known authorization server, and when the extracted authorization information is not modified and is issued from the known authorization server, verify whether the extracted authorization information permits execution of the I/O command;
permit or inhibit execution of the received I/O command or the control command generated from the received I/O command with respect to a logical area that is an execution target of the I/O command, in accordance with an authorization result indicating whether the extracted authorization information permits execution of the I/O command;
acquire reliability base information that is used by the controller to verify whether the extracted authorization information is not modified and is issued from the known authorization server, and maintain and manage the acquired reliability base information; and
generate the control command based on the I/O command; and
storage circuitry configured to temporarily store data,
wherein the controller circuitry is configured to:
generate first identification information capable of identifying the received I/O command in accordance with the extracted authorization information;
store the authorization result of the extracted authorization information and the first identification information in the storage circuitry in a state where the authorization result and the first identification information are associated with each other;
generate second identification information capable of identifying the received I/O command in accordance with the received I/O command; and
store the received I/O command, a first logical area that is an execution target of the received I/O command, and the second identification information in the storage circuitry in a state where the received I/O command, the first logical area, and the second identification information are associated with each other;
determine whether the first identification information matching the second identification information is stored in the storage circuitry;
when the first identification information matching the second identification information is stored in the storage circuitry and the authorization result associated with the first identification information permits execution of the received I/O command, permit execution of the received I/O command in the first logical area; and when the first identification information matching the second identification information is not stored in the storage circuitry, or when the first identification information matching the second identification information is stored in the storage circuitry and the authorization result associated with the first identification information does not permit execution of the received I/O command, inhibit execution of the received I/O command in the first logical area.

11. An I/O command control device, configured to connect to a storage device that divides a physical area into one or more logical areas and performs reading and writing of information based on an I/O command for each of the one or more logical areas, the physical area storing information to be read and information that is written, the I/O command control device comprising:

I/O command interface circuitry configured to receive the I/O command from an external control entity;

control command interface circuitry configured to transmit a control command for controlling the storage device to the storage device, the control command being generated based on the I/O command;

a controller circuitry configured to:

receive the I/O command to which authorization information is appended, for each logical area that is an execution target of the I/O command via the I/O command interface circuitry, and extract the authorization information from the received I/O command, the authorization information indicating whether execution of the I/O command is permitted and being protected from modification performed by a sender of the I/O command;

verify, for each of the logical areas, whether the extracted authorization information is not modified and is issued from a known authorization server, and when the extracted authorization information is not modified and is issued from the known authorization server, verify whether the extracted authorization information permits execution of the I/O command;

permit or inhibit execution of the received I/O command or the control command generated from the received I/O command with respect to a logical area that is an execution target of the I/O command, in accordance with an authorization result indicating whether the extracted authorization information permits execution of the I/O command;

acquire reliability base information that is used by the controller to verify whether the extracted authorization information is not modified and is issued from the known authorization server, and maintain and manage the acquired reliability base information; and generate the control command based on the I/O command, wherein the I/O command interface circuitry is communication interface circuitry configured to transmit and receive a datagram of a storage protocol by using a communication protocol, and the datagram of the storage protocol received by using the communication protocol includes the I/O command, the control command interface circuitry is local bus interface circuitry for connecting to a local bus, the I/O command control device further comprises a communication protocol processor configured to process the communication protocol, the controller circuitry is capable of transmitting and receiving the I/O command for a third logical area among the one or more logical areas via the local bus by processing the storage protocol, and is configured to perform a storage protocol process of converting the I/O command into the control command based on the third logical area; and extract the authorization information that is protected from modification performed by a sender of the I/O command, from data of the communication protocol that is received by using any one of a method of storing the authorization information in a header portion or a data portion of the communication protocol processed by the communication protocol processing unit, a method of using a packet of the communication protocol different from a packet including the converted I/O command, and a method of using a logical communication path of the communication protocol different from a logical communication path for the converted I/O command and having a correspondence relationship with the third logical area that is an execution target of the I/O command.

12. The I/O command control device according to claim 11, wherein the controller circuitry includes a general-purpose processing unit comprising at least one of a processor capable of executing software or a hardware processing unit capable of being dynamically reconfigured by reading configuration information, the I/O command control device further comprises a nonvolatile auxiliary memory configured to store the software executed by the general-purpose processing unit or the configuration information of the hardware processing unit capable of being dynamically reconfigured, and at least part of function of the controller is implemented by the software executed by the general-purpose processing unit or the hardware processing unit capable of being dynamically reconfigured.

13. An information storage device comprising:

a nonvolatile memory; and the I/O command control device according to claim 1, wherein the I/O command interface circuitry is local bus interface circuitry configured to receive the I/O command and transmit and receive data in a protocol of a local bus, the control command interface circuitry is interface circuitry for transmitting a command for controlling the nonvolatile memory to the nonvolatile memory and transmitting and receiving data between the controller and the nonvolatile memory, and the controller circuitry is configured to generate the command for controlling one of the one or more logical areas that are configured on the nonvolatile memory as the control command in accordance with the I/O command.

14. The information storage device according to claim 13, wherein the controller circuitry includes a general-purpose processing unit including at least one of a processor capable of executing software or a hardware processing unit capable of being dynamically reconfigured by reading configuration information, the I/O command control device further comprises a nonvolatile auxiliary memory configured to store the software executed by the general-purpose processing unit or the configuration information of the hardware processing unit capable of being dynamically reconfigured, and at least part of function of the controller is implemented by the software executed by the general-purpose processing unit or the hardware processing unit capable of being dynamically reconfigured.

15. The information storage device according to claim 11,
wherein the controller circuitry is configured to permit execution of a control command that is used for an internal operation for maintenance and management of the nonvolatile memory regardless of the authorization information, and the maintenance and the management of the nonvolatile memory includes creation and deletion of each of the one or more logical areas.

* * * * *